(12) United States Patent
Ide et al.

(10) Patent No.: US 7,267,864 B2
(45) Date of Patent: Sep. 11, 2007

(54) IMAGE SUPPORTING MATERIAL, METHOD FOR USE THEREOF AND IMAGE FORMING APPARATUS UTILIZING THE SAME

(75) Inventors: Osamu Ide, Kanagawa (JP); Shigeru Hayashi, Kanagawa (JP); Katsumi Daimon, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 477 days.

(21) Appl. No.: 10/940,636

(22) Filed: Sep. 15, 2004

(65) Prior Publication Data

US 2005/0214485 A1    Sep. 29, 2005

(30) Foreign Application Priority Data

Mar. 26, 2004   (JP) .......................... P. 2004-093498

(51) Int. Cl.
   *B32B 27/08*   (2006.01)
   *B32B 27/10*   (2006.01)
   *B32B 27/36*   (2006.01)
   *B32B 27/32*   (2006.01)

(52) U.S. Cl. ...................... 428/212; 428/213; 428/214; 428/215; 428/216; 428/323; 428/332; 428/334; 428/335; 428/336; 428/340; 428/480; 428/481; 428/483; 428/195.1; 428/206; 428/207; 428/211.1; 430/18; 430/48; 430/97; 430/109.1; 430/109.4; 430/120.1; 430/124.1; 430/124.11; 430/124.13; 430/124.3; 430/124.5; 430/125.53; 430/125.54; 430/137.1; 525/165; 525/173; 525/174; 525/177; 525/176; 525/437; 525/444

(58) Field of Classification Search .................... None
See application file for complete search history.

(56) References Cited

U.S. PATENT DOCUMENTS

| 5,055,371 A * | 10/1991 | Lee et al. ............. 430/124.51 |
| 6,387,478 B2 * | 5/2002 | Fujimoto .................... 428/215 |
| 7,063,888 B2 * | 6/2006 | Ide .............................. 428/323 |
| 2005/0214485 A1 * | 9/2005 | Ide et al. ................. 428/32.38 |
| 2006/0051686 A1 * | 3/2006 | Ide et al. ...................... 430/18 |
| 2007/0048653 A1 * | 3/2007 | Ide ............................. 430/120 |

FOREIGN PATENT DOCUMENTS

| JP | 2000-010329 | 1/2000 |
| JP | 2000-091212 | 3/2000 |
| JP | 2000-003060 | 1/2001 |
| JP | 2001-117259 | 4/2001 |

* cited by examiner

*Primary Examiner*—Vivian Chen
(74) *Attorney, Agent, or Firm*—Morgan, Lewis & Bockius LLP

(57) ABSTRACT

The present invention provides an image supporting material for fixably supporting a color toner image, the material including a base material, a light scattering layer provided on the base material and containing a white pigment and a thermoplastic resin, and a color toner receptive layer provided on the light scattering layer and containing at least a thermoplastic resin, wherein the thermoplastic resin in the light scattering layer is constituted of a polyolefin or a polyolefinic copolymer having a temperature, at which viscosity becomes $5 \times 10^3$ Pa·s, of 100° C. or higher, and the thermoplastic resin in the color toner receptive layer is constituted of a resin obtained by melt mixing of a crystalline polyester resin and an amorphous resin and having a temperature, at which viscosity becomes $10^3$ Pa·s, equal to or higher than 65° C. but lower than 80° C.

25 Claims, 9 Drawing Sheets

FIG. 7

Properties of crystalline polyester resins A - G

| Resin | Composition | Comp. mol.ratio | Mw/Mn | Tm (°C) |
|---|---|---|---|---|
| A | sebacic acid/ND/BPA | 100/95/5 | 22000/11000 | 72 |
| B | dodecanedioic acid/ND/BPS | 100/95/5 | 23000/12000 | 74 |
| C | sebacic acid/ethylene glycol/BPS | 100/95/5 | 22000/11000 | 72 |
| D | sebacic acid/butanediol | 100/100 | 24000/13000 | 68 |
| E | dodecanedioic acid/hexanediol | 100/100 | 30000/14000 | 75 |
| F | succinic acid/ethylene glycol | 100/100 | 22000/10900 | 102 |
| G | adipic acid/xylylene glycol | 100/100 | 19000/9000 | 86 |

FIG. 8

Properties of amorphous resins H - L

| Resin | Composition | Comp. mol.ratio | Mw/Mn | Tm (°C) |
|---|---|---|---|---|
| H | TPA/ND/BPA | 100/25/75 | 13000/6000 | 58 |
| I | TPA/ND/BPA | 100/15/85 | 12000/5600 | 62 |
| J | TPA/BPA | 100/100 | 13000/6000 | 82 |
| K | TPA/BPA/CHDM | 100/80/20 | 10000/4500 | 62 |
| L | styrene/butyl acrylate/acrylic acid | 100/57/3 | 30000/14000 | 58 |

FIG. 9

Properties of color toner developers X - Z

| Developer | Composition | Resin | Tg/Tm | $T_2$ |
|---|---|---|---|---|
| X | amorphous PES | K | 62/- | 105 |
| Y | St-BA copolymer | L | 57/- | 100 |
| Z | crystalline PES/amorphous PES | B/H | 45/75 | 80 |

FIG. 10

Examples

|  | Developer | Base resin | $T_1$ |
|---|---|---|---|
| Example 1 | X | A/H | 75 |
| Example 2 | X | B/I | 78 |
| Example 3 | Y | C/H | 75 |
| Example 4 | Y | B/H | 76 |
| Example 5 | Z | B/H | 76 |
| Example 6 | Z | B/L | 79 |
| Example 7 | Z | E/K | 78 |
| Example 8 | Z | B/J | 80 |

FIG. 11

Comparative Examples

|  | Developer | Base resin | $T_1$ |
|---|---|---|---|
| Comp. Ex. 1 | X | none | - |
| Comp. Ex. 2 | X | H | 115 |
| Comp. Ex. 3 | Z | F/J | 105 |
| Comp. Ex. 4 | Z | G/J | 90 |
| Comp. Ex. 5 | Z | B | 74 |

FIG. 12

Evaluation results

| | Mechanical strength | Heat resistance | Luster | Smoothness | Y | Solidifying speed | Total image quality |
|---|---|---|---|---|---|---|---|
| Example 1 | ○ | △ | △ | △ | 0.8 | ○ | △ |
| Example 2 | ○ | △ | △ | △ | 1.0 | △ | △ |
| Example 3 | △ | △ | △ | △ | 2.5 | △ | ○ |
| Example 4 | ○ | ○ | ○ | ○ | 0.8 | ○ | ○ |
| Example 5 | ○ | △ | △ | △ | 0.8 | ○ | ○ |
| Example 6 | △ | △ | ○ | △ | 2.5 | △ | ○ |
| Example 7 | △ | △ | ○ | ○ | 2.2 | △ | ○ |
| Example 8 | △ | ○ | △ | △ | 2.0 | △ | ○ |
| Comp.Ex. 1 | ○ | ○ | × | × | – | ○ | × |
| Comp.Ex. 2 | × | ○ | × | × | 0.5 | ○ | × |
| Comp.Ex. 3 | ○ | ○ | × | × | 2.5 | △ | × |
| Comp.Ex. 4 | ○ | ○ | △ | △ | 2.0 | △ | △ |
| Comp.Ex. 5 | ○ | ○ | × | ○ | 3.5 | × | × |

IMAGE SUPPORTING MATERIAL, METHOD FOR USE THEREOF AND IMAGE FORMING APPARATUS UTILIZING THE SAME

BACKGROUND OF THE INVENTION

1. Field of the Invention

The present invention relates to an image supporting material for use in an image forming apparatus such as a copying machine or a printer, and more particularly to an image supporting material adapted for use in color image formation for example by an electrophotographic process, a method for use thereof and an improvement in an image forming apparatus utilizing the same.

2. Background Art

For a color image formation in a prior color image forming apparatus for example by an electrophotographig process, following image forming steps are usually adopted.

A light reflected from an illuminated original is color separated by a color scanner and subjected to image processing and color correction in an image processing apparatus to obtain image signals of plural colors, each of which is converted into a modulated laser beam for example with a semiconductor laser. An image bearing member, utilizing an inorganic photosensitive material such as selenium or amorphous silicon or an organic photosensitive material including a phthalocyanine pigment or a bisazo pigment as a charge generation layer, is irradiated with such laser beams in succession for respective colors to form plural electrostatic latent images. Such plural electrostatic latent images are developed in succession with charged 4-color toners of Y (yellow), M (magenta), C (cyan) and K (black). The developed toner images are transferred from the image bearing member utilizing the inorganic or organic photoconductive material onto an image supporting material and fixed in a fixing apparatus of heat-pressurizing method. A color image is thus obtained on the image supporting material.

The color toner employed in the above-described process is constituted of particles of an average particle size of 1 to 15 µm prepared by dispersing a colorant in a binder resin such as a polyester resin, a Styrene/acrylic copolymer, or a styrene/butadiene copolymer, on which deposited are fine particles of an average particle size of 5 to 100 nm, for example inorganic fine particles such as of silicon oxide, titanium oxide or aluminum oxide or organic fine particles such as of PMMA or PVDF.

The colorant for Y (yellow) color can for example be benzidine yellow, quinoline yellow or Hanza yellow, that for M (magenta) color can be rhodamine B, rose Bengal or pigment red, that for C (cyan) color can be phthalocyanine blue, aniline blue or pigment blue, and that for K (black) color can be carbon black, aniline black or a mixture of color pigments.

As the image supporting material mentioned above, there is being utilized a plain paper principally constituted of pulp, a coated paper coated with a resin mixed with a white pigment or the like on a plain paper, or a white film constituted of a resin such as polyester mixed with a white pigment.

Particularly for forming an image of a high luster equivalent to that of a silver halide-based photograph, it is known preferable, as described in JP-A-2000-010329, JP-A-2000-003060 and JP-A-2000-091212, to use an image supporting material having a layer of a thermoplastic resin of a certain thickness on a plain paper, a coated paper or a white film.

Also for printing a photographic image, an image supporting material of a large thickness is generally preferred.

In the aforementioned transfer step, there is known a method of providing a transfer roller or a transfer belt, prepared for example with a dielectric material, in an opposed relation to the image bearing member constituted for example of a photosensitive member, causing an image supporting material to be adhered in advance on the transfer roller or the transfer belt and applying a bias to the transfer roller or providing a transfer member (such as a transfer corotron, a biased transfer roller or a biased transfer brush) behind the transfer belt, to apply an electric field of a polarity opposite to that of the toner from the transfer roller or from the back of the transfer belt, thereby electrostatically transferring the toner images one by one onto the image supporting material.

In the aforementioned transfer step, there is also known a method of providing an intermediate transfer member for example of a belt shape, prepared for example with a dielectric material, in an opposed relation to the image bearing member constituted for example of a photosensitive member, then applying an electric field of the polarity opposite to that of the toner by a predetermined primary transfer member (such as a transfer corotron, a biased transfer roller or a biased transfer brush) to transfer the toner images formed on the image bearing member one by one onto the intermediate transfer member, thereby once forming a color toner image on the intermediate transfer member, and applying an electric field of the polarity opposite to that of the toner by a predetermined secondary transfer member (such as a transfer corotron, a biased transfer roller or a biased transfer brush) from the back of the base material to electostatically transfer the color toner image onto the base material.

Also in the aforementioned fixing step, there are known a heat-pressure fixing method in which a heat source such as an incandescent lamp is incorporated in a pair of mutually pressed fixing rollers and the image supporting material bearing the transferred color toner image is passed between such paired fixing rollers whereby the color toner is thermally fused and fixed to the image supporting material, and a cool-peeling fixing method in which a fixing belt bearing a superficial releasing layer such as of silicone rubber is supported by plural tension rollers and, a pair of fixing rollers are provided in mutually opposed positions across the fixing belt and a heat source such as an incandescent lamp is incorporated in the paired fixing rollers, wherein the image supporting material bearing the transferred color toner image is superposed with the fixing belt, and passed between the paired fixing roller to fix the toner image by heat and pressure, and the color toner image is separated after cooling thereof from the fixing belt, thus achieving fixation of the color toner image to the base material.

The latter fixing method is known preferable particularly for forming an image of a high gloss equivalent to a silver halide-based photograph. Also a uniform high gloss, irrespective of the image density, can be obtained by combining the latter fixing method and a base material provided with the aforementioned thermoplastic resin layer.

The above is disclosed in JP-A-2000-010329, JP-A-2000-003060, JP-A-2000-091212 and JP-A-2001-117259.

In such image forming apparatus, in case of adopting the image supporting material with the aforementioned thermoplastic resin layer as a base material, a white PET film or a coated paper results in an extremely expensive image supporting material though the image quality can be improved.

On the other hand, an inexpensive plain paper is associated with a technical drawback of being unable to obtain a satisfactory image quality.

Also in case the aforementioned thermoplastic resin is principally formed by an amorphous resin such as polyester, polystyrene or polyacrylic resin, there is encountered a technical drawback that a low-temperature fixing property, a heat resistance and a mechanical strength cannot be satisfied at the same time.

More specifically, in order to reduce the energy consumption in the image formation, a low-temperature fixing property is essential, for which a reduction in the molecular weight of the resin and a decrease in the glass transition point thereof are effective measures.

On the other hand, an image of a smooth surface as in a photograph may cause a blocking phenomenon (surfaces being stuck unseparably or damaged even when separated) when let to stand in a state where the front surface of the image is in contact with the front surface or the rear surface of another image, or with a material of an album, in a high temperature environment such as a storage in an automobile or in a warehouse in summer or a transportation in a ship bottom.

In such case, for improving the durability at a high temperature, namely the heat resistance, an elevation of the glass transition point or a high molecular weight is effective.

Also a strength against a image bending, namely mechanical strength, is an important point. An increase in molecular weight is an effective measure for improving mechanical strength.

Thus the measures for improving mechanical strength and the heat resistance are contradictory to those for improving the low-temperature fixing property. Also it is necessary to employ a higher fixing temperature particularly in case of preparing an image of a high gloss as in a silver halide-based photograph, so that it becomes further difficult to meet the three requirements at the same time.

Also the JP-A-2001-117259 proposes to use an image supporting material coated with a crystalline polyester resin. In such case, the low-temperature fixing property and the storage property can be improved, but the mechanical strength is reduced. Also in comparison with a silver halide-based photograph, such image supporting material is inferior in luster and whiteness, and cannot provide a satisfactory photographic quality by forming a color toner image thereon.

Therefore, the present inventors have tried to use an image supporting material having, on a base paper composed at least of a pulp material with a basis weight of 150 to 200 g/m$^2$, a light diffusion layer (corresponding to a light scattering layer) formed by dispersing a white pigment such as titanium oxide by about 30 wt. % in a polyolefinic resin such as polyethylene.

Such image supporting material can be produced relatively inexpensively, and can provide an image with a high whiteness.

In this case, however, there is encountered a technical drawback that a preferred surface structure of a high gloss uniform over the entire image cannot be obtained because the light diffusion layer at the surface of the image supporting layer has a high melt viscosity at the fixing step.

SUMMARY OF THE INVENTION

The present invention, made for resolving the aforementioned technical drawbacks, is to provide an image supporting material showing a high luster uniform over the entire image as in a silver halide-based photograph, and capable of easily satisfying heat resistance, mechanical strength and low-temperature fixing property suited for a fixing device of a low energy consumption, and a method for using the same and an image forming apparatus utilizing the same.

The present invention provides an image supporting material 1 for fixably supporting a color toner image 4 including at least a thermoplastic resin and a colorant, the material including, as shown in FIG. 1, a base material 1a, a light scattering layer 1b provided on the base material 1a and containing a white pigment and a thermoplastic resin, and a color toner receptive layer 1c provided on the light scattering layer 1b and containing at least a thermoplastic resin, wherein the thermoplastic resin in the light scattering layer 1b is constituted of a polyolefin or a polyolefinic copolymer having a temperature Tb, at which viscosity becomes $5 \times 10^3$ Pa·s, of 100° C. or higher, and the thermoplastic resin in the color toner receptive layer 1c is constituted of a resin obtained by melt mixing of a crystalline polyester resin and an amorphous resin and having a temperature $T_1$, at which viscosity becomes $10^3$ Pa·s, equal to or higher than 65° C. but lower than 80° C.

In such technical constitution, the image supporting material 1 is only required to have at least the light scattering layer 1b and the color toner receptive layer 1c on the base material 1a, and may naturally include another layer (such as a gelatin layer, an antistatic layer or the like) if necessary.

The base material 1a can be a base paper ordinarily employed in a photographic printing paper, and such base paper preferably has a basis weight of 100 to 250 gsm for providing a satisfactory feeling when held with a hand.

For the light scattering layer 1b, it is required that the thermoplastic resin therein is constituted of a polyolefin or a polyolefinic satisfying a viscosity condition of "having a temperature Tb, at which viscosity becomes $5 \times 10^3$ Pa·s, of 100° C. or higher".

Such viscosity condition allows to avoid a problem that the surface smoothness of the light scattering layer 1b is deteriorated by vapor bubbles generated from the base material 1a at the fixing process.

In a preferred embodiment, the light scattering layer 1b includes a white pigment in an amount of 20 to 40 wt. % for preventing an image see-through and securing a mechanical strength and a flatness, and more preferably it has a thickness of 20 to 50 μm for effectively preventing an image see-through and cracking.

Also for the light scattering layer 1c, it is required that the thermoplastic resin therein is constituted of a resin obtained by a melt mixing of a crystalline polyester resin and an amorphous resin and having a viscosity condition of "having a temperature $T_1$, at which viscosity becomes $10^3$ Pa·s, equal to or higher than 65° C. but lower than 80° C.".

Such viscosity condition allows to complete embed the color toner image 4 in the color toner receptive layer 1c by the fixing as shown in FIG. 1, thereby obtaining a smooth and highly glossy image surface.

A temperature $T_1$ at which viscosity becomes $10^3$ Pa·s is lower than 65° C. results in an insufficient heat resistance, leading to a blocking phenomenon when the image is left standing. On the other hand, a temperature equal to or higher than 80° C. is unable to provide a smooth and highly lustrous image surface. In particular, a step difference remains at a boundary between a high density area and a low density area also on the image surface even after fixing.

In a preferred embodiment, the color toner receptive layer 1c contains the thermoplastic resin with a blending proportion of 70 wt. % or higher in consideration of viscosity and heat resistance.

Also the color toner receptive layer 1c preferably has a thickness of 5 to 20 μm for achieving a high luster and preventing cracking.

Furthermore, in the color toner receptive layer 1c, the thermoplastic resin in a preferred embodiment has a mixing weight ratio of the crystalline polyester resin and the amorphous resin within a range from 35:65 to 65:35.

Also for melt mixing of the thermoplastic resin of the color toner receptive layer 1c, in a preferred embodiment, the melt mixing of the crystalline polyester resin and the amorphous resin can be executed under a condition of a temperature T (° C.) within a range from $T_0$ to $T_0+20$ and a time t (minute) within a range from $t_0$ to $10 \times t_0$, in which a melt mixing for a time $t_0$ (minute) at a temperature $T_0$ (° C.) of the crystalline polyester resin and the amorphous resin provides a resin showing a visual reflectance Y of 1.5% in a film of 20 μm.

In such embodiment, it is more preferable that the temperature T (° C.) is within a range from $T_0+5$ to $T_0+10$ and the time t (minute) is within a range from $t_0$ to $3 \times t_0$, in consideration of heat resistance and mechanical strength.

Also the crystalline polyester resin and the amorphous resin include a common alcohol-derived component or a common acid-derived component, for the purpose of improving melt mixing property of both resins.

In a preferred embodiment of the alcohol-derived component and the acid-derived component of the crystalline polyester resin, in consideration of a low-temperature fixing property, a heat resistance, a melt fixing property and a mechanical strength, the alcohol-derived component of the crystalline polyester resin is principally constituted of a linear aliphatic component with 2 to 12 carbon atoms, in which the linear aliphatic component represents 85 to 100 mol. % of all the alcohol-derived component, and an acid-derived component of the crystalline polyester resin is principally constituted of a linear aliphatic component with 4 to 12 carbon atoms, in which an aromatic component represents 90 mol. % or more of all the acid-derived component.

In such embodiment, the crystalline polyester resin preferably includes an aliphatic monomer in a molar ratio of 85% or higher, for attaining a low-temperature fixing property and a short fixing time after the cooling.

Also in consideration of low-temperature fixing property, the acid-derived component of the crystalline polyester resin is preferably constituted principally of a linear aliphatic compound with 4 to 12 carbon atoms.

Furthermore, in such embodiment, the amorphous resin is constituted of a styrene-acrylic resin or a polyester resin, but it is preferably a polyester resin for meeting a low-temperature fixing property, a heat resistance, a melt mixing property etc.

In a preferred embodiment of the alcohol-derived component and the acid-derived component of the amorphous polyester resin, the alcohol-derived component of the amorphous polyester resin includes a linear aliphatic component which is the same as the linear aliphatic component with 2 to 12 carbon atoms, constituting a principal component of the alcohol-derived component of the crystalline polyester resin, and which represents 10 to 30 mol. % of all the alcohol-derived component, and the acid-derived component of the amorphous polyester resin includes an aromatic component, such as terephthalic acid, isophthalic acid or napththalenedicarboxylic acid, which represents 90 mol. % or more of all the acid-derived component.

Also in an embodiment in which the amorphous resin utilizes a styrene-acrylic resin, it preferably includes a styrene-based resin and an acrylic resin by 80% or more in consideration of low-temperature fixing property and heat resistance.

Also in an embodiment in which the crystalline polyester resin includes an aromatic component which is an alcohol-derived component as a third component, in consideration of a melt mixing property, a heat resistance and a low-temperature fixing property, the alcohol-derived component of the crystalline polyester resin includes a linear aliphatic component with 2 to 12 carbon atoms and an aromatic diol-derived component, in which the linear aliphatic component represents 85 to 98 mol. % and the aromatic diol-derived component represents 2 to 15 mol. % with respect to all the alcohol-derived components, and the alcohol-derived component of the amorphous polyester resin includes a linear aliphatic component and an aromatic diol-derived component which are the same as principal components of the alcohol-derived component of the crystalline polyester resin, and in which the linear aliphatic component represents 10 to 30 mol. % and the aromatic diol-derived component represents 70 to 90 mol. % with respect to all the alcohol-drived components.

Also in a preferred embodiment of the crystalline and amorphous polyester resins in consideration of a low-temperature fixing property and a mechanical strength, the crystalline polyester resin has a weight-averaged molecular weight of 17,000 to 30,000 and the amorphous polyester resin has a weight-averaged molecular weight of 8,000 to 40,000.

Furthermore, the color toner receptive layer 1c preferably includes inorganic fine particles in an amount of 3 to 30 wt. %, in order to accelerate solidification of the resin after fixing.

The inorganic fine particles are preferably constituted of titanium dioxide or silica with a particle size of 8 to 400 nm.

Also for effectively preventing conveying failure or dust deposition on the image supporting material 1, the image supporting material 1 preferably has an antistatic layer on at least either of the front surface and the rear surface.

Furthermore, for increasing the image gloss, the image supporting material 1 preferably has a gelatin layer between the light scattering layer 1b and the color toner receptive layer 1c.

Also in a preferred method of using the image supporting material 1, in order to effectively preventing a bubble generation or an image defect (such as a spot-like image void or an image density saturation), the thermoplastic resin of the color toner image 4 is principally constituted of a polyester resin or a styrene-acrylic resin having a temperature $T_2$ (° C.), at which viscosity thereof becomes $10^4$ Pa·s, equal to or higher than $T_1$ (° C.) but is lower than $T_1+20$ (° C.)

Furthermore, the thermoplastic resin of the color toner preferably includes at least a crystalline polyester resin and an amorphous styrene-acrylic resin.

The present invention relates not only to the image supporting material 1 described above but also to an image forming apparatus utilizing such image supporting material 1.

In this regard, the present invention provides an image forming apparatus including, as shown in FIG. 1, an image supporting material 1 for fixably supporting a color toner image 4 including at least a thermoplastic resin and a colorant, an image forming unit 2 for forming a color toner image 4 on the image supporting material, and a fixing apparatus 3 for fixing the color toner image 4, formed by the image forming unit 2, on the image supporting material 1, wherein the image supporting material 1 includes a base material 1a, a light scattering layer 1b provided on the base material 1a and containing a white pigment and a thermoplastic resin, and a color toner receptive layer 1c provided on the light scattering layer 1b and containing at least a thermoplastic resin, wherein the thermoplastic resin in the light scattering layer 1b is constituted of a polyolefin or a polyolefinic copolymer having a temperature Tb, at which viscosity becomes $5 \times 10^3$ Pa·s, of 100° C. or higher, and the thermoplastic resin in the color toner receptive layer 1c is constituted of a resin obtained by a melt mixing of a crystalline polyester resin and an amorphous resin and having a temperature $T_1$, at which viscosity becomes $10^3$ Pa·s, equal to or higher than 65° C. but lower than 80° C. As the amorphous resin, for example a polyester resin or a styrene-acrylic resin can be employed.

In such image forming apparatus, the fixing apparatus 3 for example includes, as shown in FIG. 1, a fixing member 3a contacted with the image supporting material 1 across an image G thereon, heat-pressurizing means 3b which heats and pressurizes the color toner image 4 on the image supporting material 1, and cool-peeling means 3c which cools and peels the heat-pressurized color toner image 4 from the fixing member 3a.

In this embodiment, by peeling after cooling after the heat-pressurizing step, the surface structure of the fixing member 3a is directly transferred onto the surface of the image on the image supporting material 1, so that a preferable image structure can be obtained when the fixing member 3a has a satisfactory surface structure.

The image supporting material of the present invention, in which a light scattering layer and a color toner receptive layer are provided on a base material and an image fixing property is improved by specifying the thermoplastic resins of the light scattering layer and the color toner receptive layer and by regulating viscosity characteristics thereof, has a high luster uniform over the entire image as in the silver halide-based photograph and can easily attain a heat resistance, a mechanical strength and a low-temperature fixing property with a fixing apparatus of a low energy consumption.

Also the image forming apparatus utilizing such image supporting material can employ a fixing apparatus of a low energy consumption and can easily provide an image of a high quality suited for a low cost.

BRIEF DESCRIPTION OF THE DRAWINGS

These and other objects and advantages of this invention will become more fully apparent from the following detailed description with reference to the accompanying drawings in which:

FIG. 7 is a table showing the performance of crystalline polyester resins A-G of the color toner receptive layer employed in Examples 1-8 and Comparative Examples 1-5;

FIG. 8 is a table showing the performance of amorphous resins H-L of the color toner receptive layer employed in Examples 1-8 and Comparative Examples 1-5;

FIG. 9 is a table showing properties of color toner developers X-Z;

FIG. 10 is a table listing Examples 1-8;

FIG. 11 is a table listing Comparative Examples 1-5; and

FIG. 12 is a table showing results of image evaluations in Examples 1-8 and Comparative Examples 1-5.

DETAILED DESCRIPTION OF THE PREFERRED EMBODIMENTS

In the following, the present invention will be explained in detail by embodiments thereof, with reference to the accompanying drawings.

Embodiment 1

Figure 1:
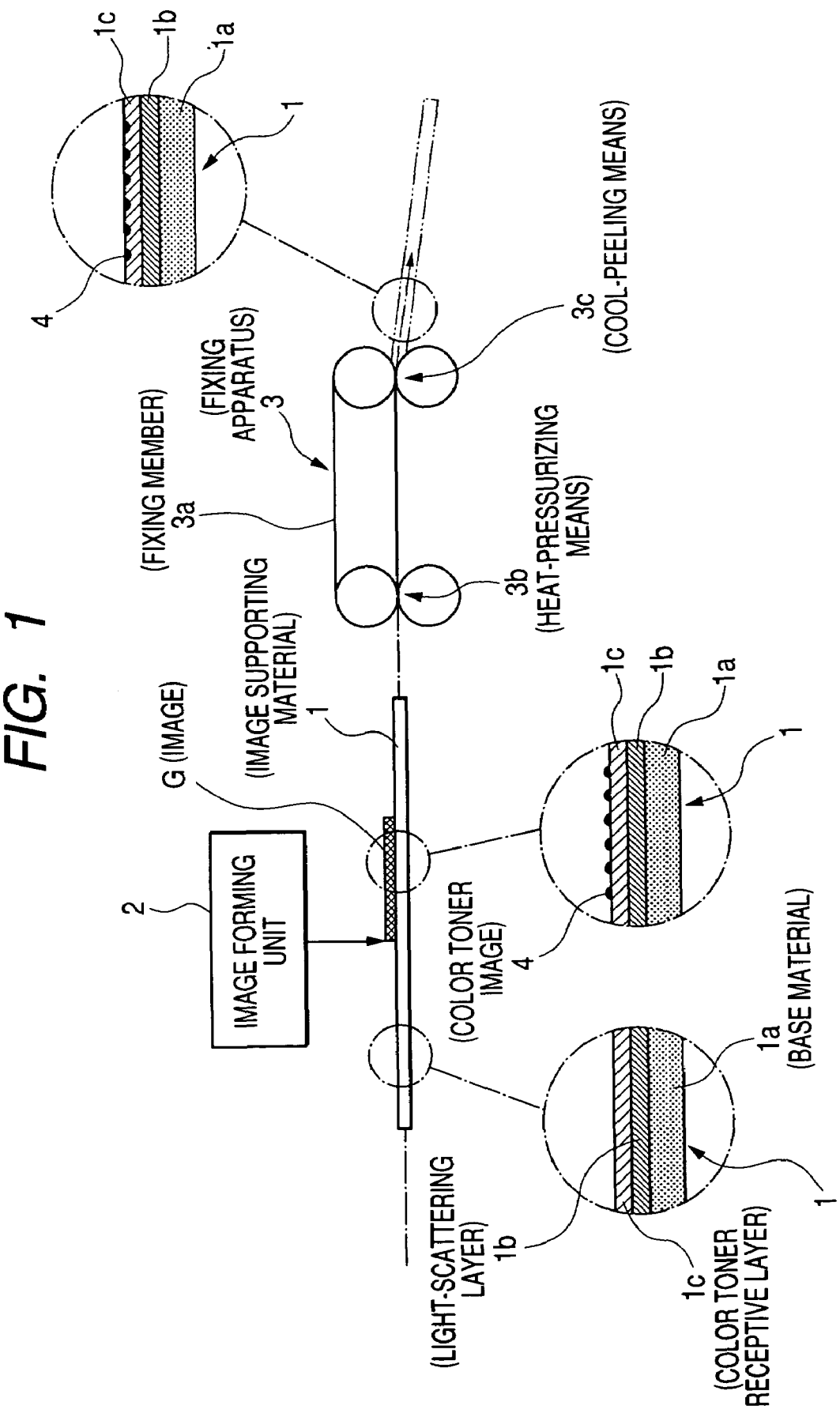
FIG. 1 is a schematic view showing an image supporting material of the present invention and an image forming apparatus utilizing the same.
Figure 2:
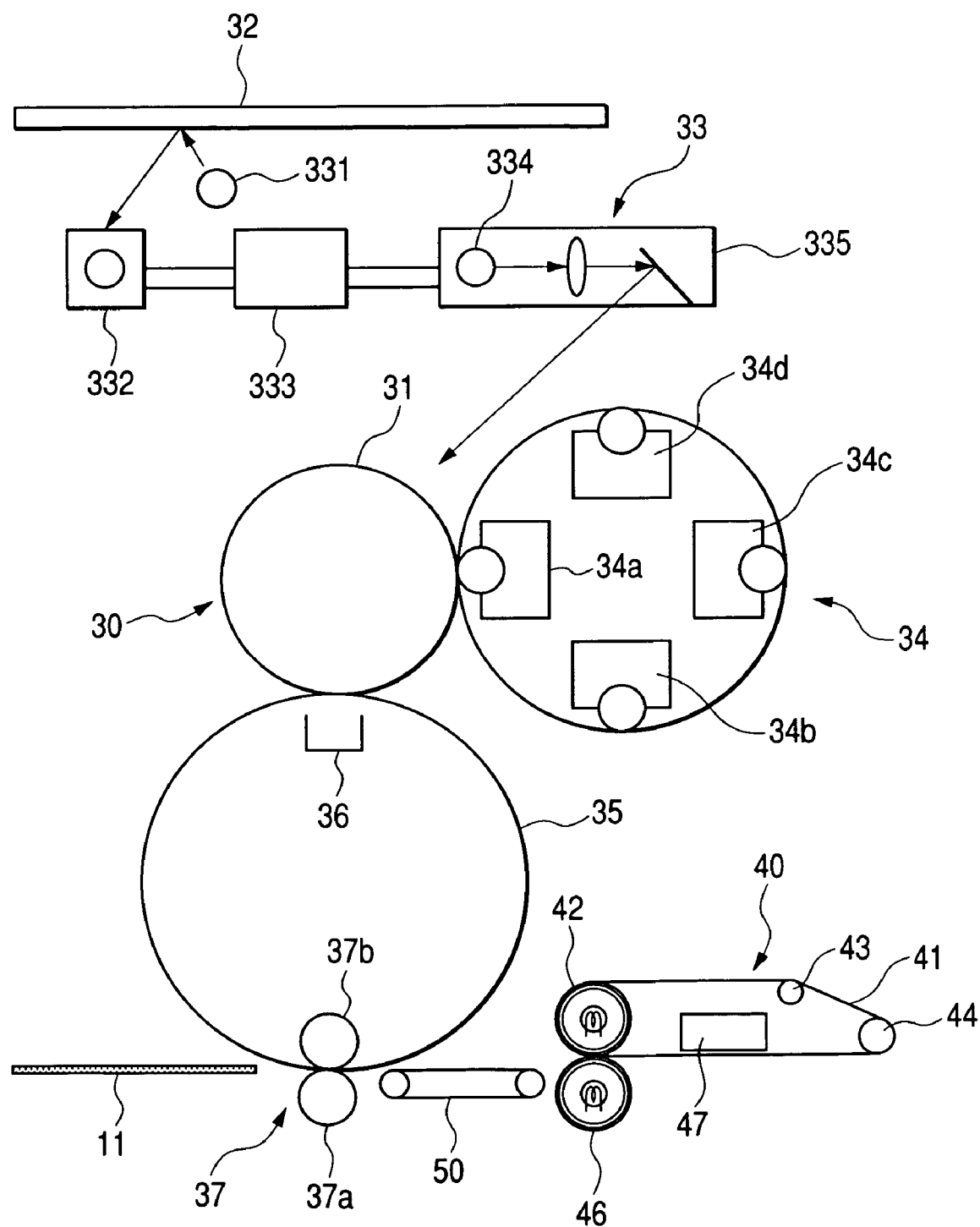
FIG. 2 is a schematic view showing the entire configuration of an image forming apparatus of an embodiment 1.

FIG. 2 shows an embodiment 1 of a color image forming apparatus embodying the present invention.

An image forming apparatus of the present embodiment shown in FIG. 2 is provided with an image forming unit 30 for forming, on an image supporting material 11, a color toner image 12 (cf. FIG. 6) formed for example by yellow, magenta, cyan and black color components, a fixing apparatus 40 for fixing the color toner image 12 formed by the image forming unit 30 on the image supporting material 11, and a conveying apparatus 50 for conveying the image supporting material 11 to the fixing apparatus 40.

Figure 3A:
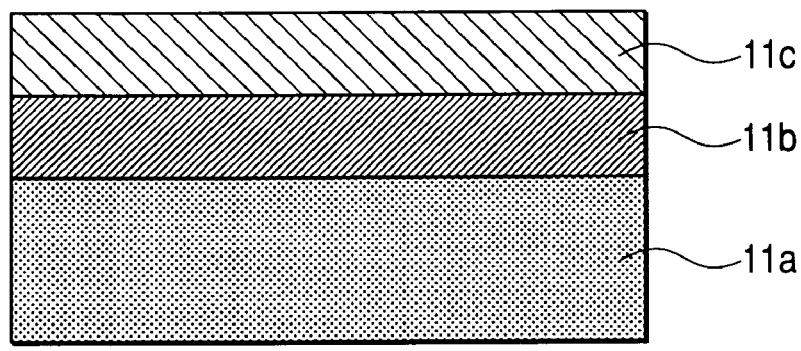
FIG. 3A is a schematic view showing a cross-sectional view of an image supporting material employed in the embodiment.

In the present embodiment, the image supporting material 11 at least includes, as shown in FIG. 3A on a base paper 11a of a basis weight of 100 to 250 gsm, a light scattering layer 11b of a thickness of 20 to 50 μm containing a white pigment in an amount of 20 to 40 wt. %, and thereon a color toner receptive layer 11c of a thickness of 5 to 20 μm containing at least a thermoplastic resin in an amount of 70 wt. % or more.

The base paper 11a is selected from materials ordinarily employed for a photographic paper. More specifically, it is principally formed from a natural pulp of needle-leafed tree or broad-leafed tree or a synthetic pulp, with an addition if necessary of a filler such as clay, talc, calcium carbonate or fine urea resin particles, a sizing agent such as rosin, an alkylketene dimer, a higher fatty acid, epoxylated fatty acid amide, paraffin wax, or alkenylsuccinic acid, a paper strength-increasing agent such as starch, polyamide polyamine epichlorhydrin, or polyacrylamide, a fixing agent such as aluminum sulfate or a cationic polymer, or the like.

The base paper 11a has a basis weight within a range of 100 to 250 gsm. A basis weight outside this range gives an unfavorable feeling when the base paper is held in a hand. The base paper 11a is preferably subjected to a surface treatment under heat and pressure, for example with a machine calender or a super calender, in order to give smoothness and flatness.

Also in forming the light scattering layer (light diffusion layer) 11b on the base paper 11a, the surface of the base paper 11a is preferably subjected to a pre-treatment such as glow discharge, corona discharge, flame treatment or anchor coat, in order to improve the adhesion between the light scattering layer 11b and the base paper 11a.

Also as the white pigment contained in the light scattering layer 11b, there can be employed fine particles of a known white pigment such as titanium oxide, calcium carbonate or barium sulfate. For improving whiteness, titanium oxide is preferably used as a principal component.

The light scattering layer 11b at least includes a white pigment in an amount of 20 to 40 wt. %.

An amount of a white pigment less than 20 wt. % leads to drawbacks of a low whiteness and a see-through phenomenon when a character or the like is written or printed on the rear surface. On the other hand, an amount exceeding 40 wt. % leads to drawbacks of an insufficient mechanical strength of the light scattering layer 11b and a difficulty in forming a layer with a smooth surface.

The thermoplastic resin included in the light scattering layer 11b is constituted of a polyolefin or a polyolefinic copolymer, such as low-density polyethylene, high-density polyethylene, polypropylene, an ethylene-acrylic acid copolymer, an ethylene-acrylic ester copolymer or an ethylene-vinyl acetate copolymer.

Further, the thermoplastic resin in the light scattering layer 11b is required to have a temperature Tb, at which viscosity becomes $5\times10^3$ Pa·s, of 100° C. or higher. Such condition allows to avoid a drawback that vapor bubbles generated from the base material 11a at the fixing process pass through the light scattering layer 11b and discharged from the image surface, thus deteriorating the surface smoothness thereof.

In the present embodiment, the light scattering layer 11b preferably has a thickness from 20 to 50 µm. A thickness less than 20 µm leads to drawbacks of a low whiteness and a see-through phenomenon when a character or the like is written or printed on the rear surface. On the other hand, a thickness exceeding 50 µm results in a drawback that the light scattering layer 11b is cracked when the material is bent.

Also the light scattering layer 11b is preferably added with a fluorescent whitening agent which absorbs an ultraviolet light and generates a fluorescence. Such image supporting material 11 can show a high whiteness and can provide an image with clear colors.

A method of mixing the resin, the white pigment and other additives constituting the light scattering layer 11b is not particularly restricted as long as the white pigment and other additives can be uniformly dispersed in the resin. For example, there can be employed a known method such as a method of adding directly to an extrusion kneader in forming the light scattering layer 11b by melt extrusion, or a method of preparing master pellets and adding them to a melt extruder.

Also a coating method for the light scattering layer 11b is not particularly restricted as long as a uniform and smooth light scattering layer 11b can be obtained.

For example, there can be utilized an apparatus based on a melt extrusion method which also serves to uniformly disperse the white pigment and other additives in the resin. The melt extrusion method includes a laminating method in which a melt resin film, extruded from a heated extruder through a wide slid die (so-called T-die), is contacted with the base paper 11a and continuously laminated by a pressing roller, and a method in which the molten resin is extruded on a cooled roller and wound up as a film. The melt extrusion method allows to easily form a uniform film, constituted of the resin, the white pigment and other additives mentioned above, on the base paper 11a. The extruder to be employed in the melt extrusion can be of one-axis type or two-axis type, but is required to have an ability capable of uniformly mixing the white pigment and other additives in the resin.

Also in forming the light scattering layer 11b, the melt resin film, extruded through slit die (so-called T-die) is preferably subjected, on a surface or both surfaces thereof, for example to a flame treatment, a corona treatment or a plasma treatment. Such treatment allows to improve the adhesion to the base paper 11a and/or to the color toner receptive layer 11c.

In the present embodiment, the image supporting material 11 is provided with a color toner receptive layer 11c on the light scattering layer 11b.

Figure 3B:
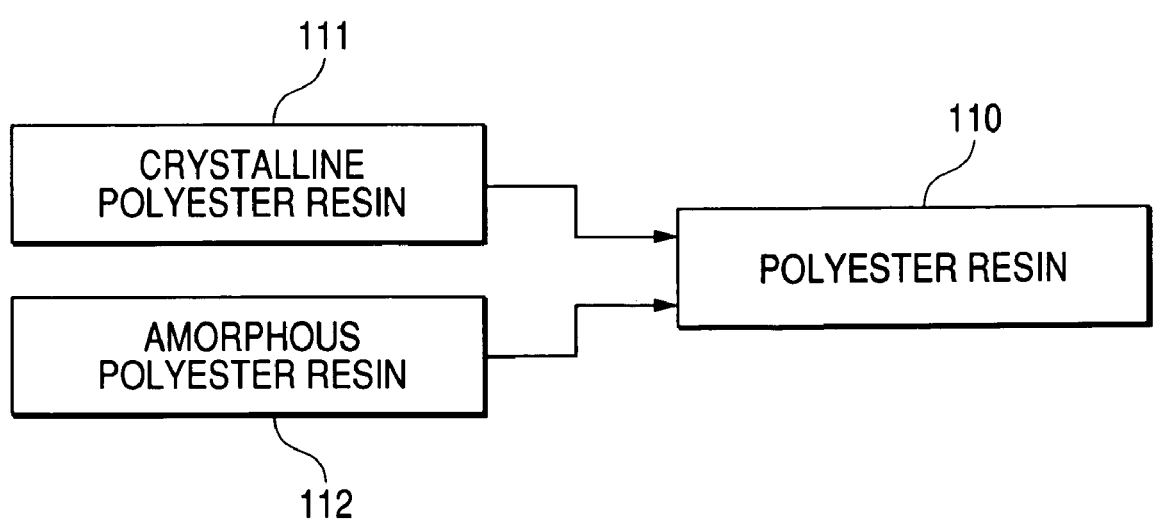
FIG. 3B is a schematic view showing the configuration of a color toner receptive layer of the image supporting material.

A thermoplastic resin in the color toner receptive layer 11c is constituted, as shown in FIG. 3B of a polyester resin 110, formed by melt mixing of a crystalline polyester resin 111 and an amorphous resin, for example an amorphous polyester resin 112. The crystalline polyester resin may be of a single kind or a mixture of plural different polyester resins. Also the amorphous resin may be of a single kind or a mixture of plural different amorphous resins.

In the present embodiment, the color toner receptive layer 11c is to have a temperature $T_1$, at which viscosity becomes $10^3$ Pa·s, equal to or higher than 65° C. but lower than 80° C. A temperature less than 65° C. results in a drawback of an insufficient heat resistance, causing a blocking phenomenon or the like during storage under a high temperature. A temperature exceeding 80° C. is unable to provide a smooth and lustrous image surfaced in the fixing. In particular, there is encountered a drawback that the image surface after fixing shows a step difference at a boundary between a high density area and a low density area.

In the present embodiment, the color toner receptive layer 11c has a thickness within a range from 5 to 20 µm.

A thickness less than 5 µm is unable to provide a smooth and lustrous image surface in the fixing at a temperature exceeding 100° C. In particular, there is encountered a drawback that the image surface after fixing shows a step difference at a boundary between a high density area and a low density area. On the other hand, a thickness exceeding 20 µm results in a drawback that the color toner receptive layer 11c is cracked when it is bent.

The thermoplastic resin in the color toner receptive layer 11c preferably has a mixing weight ratio of the crystalline polyester resin and the amorphous resin within a range from 35:65 to 65:35. A weight ratio of the amorphous resin less than 35% with respect to the total weight of the thermoplastic resin may deteriorate the heat resistance. A ratio exceeding 65% deteriorates the mechanical strength and a melt mixing property, thus requiring a higher melt temperature or a longer melting time to deteriorate productivity, and also deteriorates heat resistance.

Melt mixing of the crystalline polyester resin and the amorphous resin is preferably executed under a condition of a temperature T (° C.) within a range from $T_0$ to $T_0+20$ and a time t (minute) within a range from $t_0$ to $10\times t_0$, in which a melting mixing for a time $t_0$ (minute) at a temperature $T_0$ (° C.) of the crystalline polyester resin and the amorphous resin provides a resin showing a visual reflectance Y of 1.5% in a film of 20 µm. T less than $T_0$ or t less than $t_0$ gives an insufficient mixing, which may result in a deterioration of the mechanical strength or the heat resistance. T exceeding $T_0+20$ or t exceeding $10 \times t_0$ causes a plastification of the resin, which may result in a deterioration in heat resistance.

In consideration of heat resistance and mechanical strength, it is more preferable that the temperature T (° C.) is within a range from $T_0+5$ to $T_0+10$ and the time t (minute) is within a range from $t_0$ to $3 \times t_0$.

Figure 4:
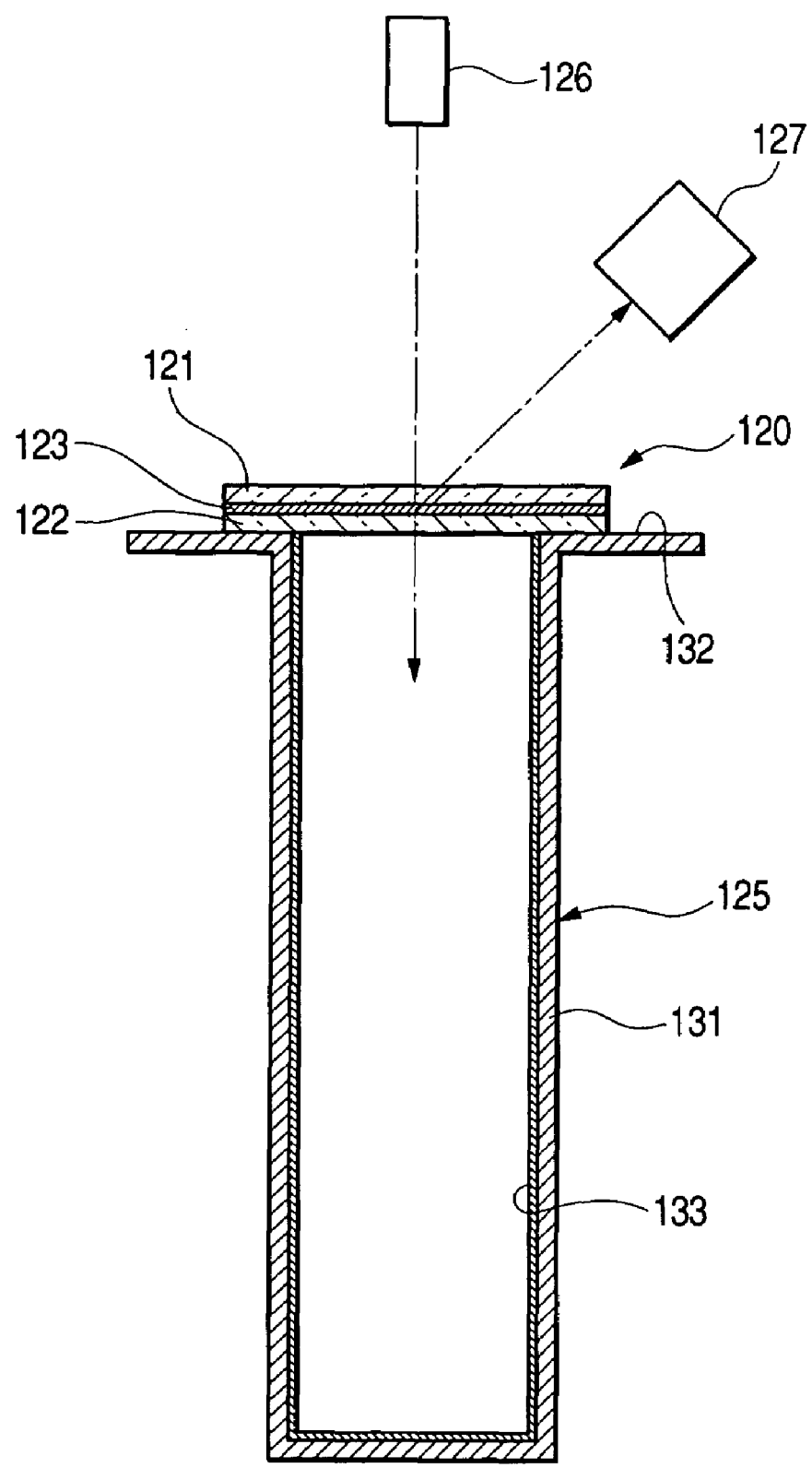
FIG. 4 is a schematic view showing an example of a measuring apparatus for a visual reflectance, which is an index of melt-mixing property of the color toner receptive layer in the image supporting material employed in the embodiment.

In the present embodiment, the aforementioned visual reflectance Y is measured for example in a manner illustrated in FIG. 4.

Referring to FIG. 4, in order to eliminate the scattering component on the top surface and the rear surface, a resin film 123 to be measured (a film of polyester resin) is sandwiched between cover glasses 121, 122 for microscopic observation, and gaps between the cover glasses 121, 122 and the resin film 123 are filled with an unillustrated refractive index matching liquid (tetradecane). The sample 120 (cover glasses 121, 122 and resin film 123) is placed on a light trap 125, and irradiated with a light from a light source 126, and a reflective measurement is executed with a colorimeter 127 (for example X-rite 968) meeting a 0°/45° geoemetric colormetric condition. The light trap 125 is constructed, for example, by providing a support table 132 on an aperture of a tubular member 131 opened at an end thereof and by forming the interior of the tubular member 131 as a light absorbing portion 133 painted for example in a black color, but it may be suitably selected as long as the light transmitted by the sample 120 can be trapped.

A Y value thus measured in the CIE XYZ color presentation system corresponds to a visual reflectance Y. The value Y becomes almost zero, in case when the measured resin film 123 is transparent and the cover glasses 121, 122 are also transparent. Stated differently, the value Y corresponds to the scattering component in the resin film 123. In case when the melt mixing of the crystalline polyester resin and the amorphous resin is insufficient, the resin film 123 formed from such resin has a high scattering intensity with a large Y value. On the other hand, an increased mixing of the both resins reduces scattering, whereby the resin film 123 shows a smaller Y value. Therefore, the value Y becomes an index for the melt mixing property.

The measured resin film 123 preferably has a thickness of 20 μm, but, in case the thickness of the resin film 123 is not exactly 20 μm, the Y value may be calculated with thickness conversion, since the value Y is approximately proportional to the film thickness when the scattering is 2% or less.

A method for preparing the resin film 123 is not particularly restricted as long as a uniform film with an even thickness can be obtained. However, a coating of a resin solution in a solvent may not provide a uniform film because the resin may be separated. A film can be obtained by placing a smooth releasing substrate on a hot plate or the like, coating a resin solution on the substrate with an Ericsen coater or a bar coater and peeling off the film from the substrate. A hot plate temperature exceeding the temperature of melt mixing may change the state of mixing, so that the hot plate has to be set at a temperature lower by at least about 20° C. than the mixing temperature.

Also the value Y may be measured with a sample 120 prepared by superposing a transparent film such as a PET film on a film (resin film 123) on the substrate, and, after applying heat and pressure, peeling off the substrate to obtain a film transferred onto the transparent film, and the Y value for the resin film 123 to be measured can be obtained by subtracting reflectance $Y_0$ of the transfer film itself from reflectance $Y_t$ of such sample 120.

In the following, the crystalline polyester resin and the amorphous resin constituting the color toner receptive layer 11c will be explained.

Crystalline Polyester Resin

The crystalline polyester resin has a melting point within a range of 65 to 90° C., preferably 70 to 80° C., and a weight-averaged molecular weight of 15,000 to 40,000, more preferably 17,000 to 30,000 in consideration of a low-temperature fixing property and mechanical strength. In the present embodiment, the melting point of the polyester resin is measured with a differential scanning calorimeter (DSC) and is obtained from a value at heat absorption peak in a measurement from the room temperature to 150° C. with a temperature elevating rate of 10° C./min.

In the present embodiment, "crystalline nature" of "the crystalline polyester resin" means that the measurement with the differential scanning calorimeter (DSC) shows a clear heat absorption peak rather than a stepwise change in heat absorption. Also a polymer obtained by copolymerizing another component to a main chain of the aforementioned crystalline polyester is also called a crystalline polyester resin, in case such another component is of a small amount and a clear heat absorption peak is shown with the differential scanning calorimeter (DSC).

In order to improve the flexibility of the resin, an alcohol-derived component of the crystalline polyester resin is preferably a linear aliphatic compound with 2 to 14 carbon atoms.

An alcohol for constituting such alcohol-derived component is preferably an aliphatic diol.

Specific examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanedio, 1,13-tridecanediol, 1,14-tetradecanediol, 1,18-octadecanediol, and 1,20-eicosanediol, but such examples are not restrictive. Among these, in consideration of a fixing property and a heat resistance, a linear aliphatic diol within a range of 2 to 12 carbon atoms is preferred, and nonanediol with 9 carbon atoms is more preferred.

In consideration of a melt mixing property and a low-temperature fixing property, the linear aliphatic diol with 2 to 12 carbon atoms is preferably contained within a range of 85 to 100 mol. % in all the alcohol-derived component.

An acid constituting the acid-derived component can be various aliphatic dicarboxylic acids.

The aliphatic dicarboxylic acid is preferably oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, or 1,18-octadecanedicarboxylic acid, or a lower alkyl ester or an acid anhydride thereof, in consideration of a low-temperature fixing property and mechanical strength, but, for the purpose of maintaining a satisfactory melt mixing property, an aromatic component preferably represents 90 mol. % or more with respect to all the acid-derived component.

Also in order to improve the melt mixing property, it is preferable to copolymerize a third component within a range of 2 to 12.5 mol. %. A reduced proportion of the third component deteriorates the melt mixing property, thus requiring a higher melt temperature or a longer melting time to deteriorate the productivity, and also deteriorates heat resistance. Also a proportion of the third component exceeding this range improves the melt mixing property but reduces the crystalline character, thus deteriorating heat resistance. A deteriorated heat resistance leads to drawbacks such as blocking or offset, in the storage of the sheet in an album, or the sheet itself left standing in a warehouse or an automobile of a high temperature.

For improving the melt mixing property, the third component is preferably a diol component such as bisphenol-A, a bisphenol-A/ethylene oxide addition product, a bisphenol-A/propylene oxide addition product, hydrogenated bisphenol-A, bisphenol-S, a bisphenol-S/ethylene oxide addition product or a bisphenol-S/propylene oxide addition product. In consideration of heat resistance, an alcohol-derived third component is preferably within a range of 2to 15 mol. % with respect to all the alcohol-derived component, more preferably 3 to 8 mol. %.

Also an acid-derived component may be added as the third component in consideration of the melt mixing property. Addition of two or more acid-derived components reduces the crystalline character, thereby improving the melt mixing property. Also for avoiding the deterioration in the heat resistance resulting from the decrease in crystalline character, the third component preferably has a proportion of 15% or less with respect to all the acid-derived component.

The third component can be an aromatic dicarboxylic acid such as terephthalic acid, dimethyl terephthalate, isophthalic acid, dimethyl isophthalate, 2,6-naphthalenedicarboxylic acid, or 4,4'-biphenyldicarboxylic acid, among which terephthalic acid, dimethyl terephthalate, isophthalic acid, dimethyl isophthalate, or 2,6-naphthalenedicarboxylic acid is preferred.

The crystalline polyester resin is not particularly restricted in the producing method, and can be produced by an ordinary polyester polymerizing method in which an acid component and an alcohol component are reacted. More specifically, it can be produced by the esterification reaction or the ester exchange reaction of a dibasic acid and a dihydric alcohol to obtain an oligomer, followed by a polycondensation reaction in vacuum. It can also be obtained, as described in JP-B No. 53-37920, by the depolymerization of a polyester. It can also be produced by an ester exchange reaction employing an alkyl ester of a dicarboxylic acid as at least one dibasic acid, followed by a polycondensation reaction, or by a direct esterification with a dicarboxylic acid followed by a polycondensation reaction.

For example, a dibasic acid and a dihydric alcohol are reacted for 2 to 5 hours at 180 to 200° C. under the atmospheric pressure, and the ester exchange reaction is terminated upon completion of distillation of water or alcohol. Then the reaction system is brought to a high vacuum of 1 mmHg or less and is heated for 1 to 3 hours at 200 to 230° C. to obtain a crystalline polyester resin.

Amorphous Resin

The amorphous resin has a glass transition point of 45 to 80° C., preferably 55 to 65° C.

The amorphous resin is preferably a styrene-acrylic resin or a polyester resin.

The amorphous resin preferably has a weight-averaged molecular weight of 8,000 to 40,000, and for example an amorphous styrene-acrylic resin preferably has a weight-averaged molecular weight of 20,000 to 40,000. Also an amorphous polyester resin preferably has a weight-averaged molecular weight of 8,000 to 20,000.

Also a third component may be copolymerized in consideration of a low-temperature fixing property and a mixing property.

In case the amorphous resin is a polyester resin, it preferably has an alcohol-derived component or an acid-derived component common with that in the crystalline polyester resin, in order to improve the melt mixing property. Particularly in case the alcohol-derived component of the crystalline polyester resin is principally constituted of a linear aliphatic component and the acid-derived component includes an aromatic component, presence of a same linear aliphatic alcohol-derived component within a range of 10 to 30 mol. % with respect to all the diol and of a same aromatic acid-derived component in an amount of 90 mol. % or more with respect to all the acid-derived component allows to satisfy the low-temperature fixing property and to improve the melt mixing property, thereby providing a mixture that can be melt mixed at a low temperature and can provide a satisfactory heat resistance.

Also in case the crystalline polyester resin includes an aromatic alcohol-derived components as the third component, the same aromatic component is preferably contained, as the principal component of the alcohol-derived component of the amorphous polyester resin, in a range of 70 to 90 mol. % with respect to all the alcohol-derived component, in consideration of the melt mixing property, heat resistance and low-temperature fixing property.

The amorphous polyester resin is not particularly restricted in the producing method, as in the case of the crystalline polyester resin, and can be produced by an ordinary polyester polymerizing method as explained in the foregoing.

For the acid-derived component, various aromatic and aliphatic dicarboxylic acids mentioned for the crystalline polyester resin can be similarly employed. As the alcohol-derived component, various diols can be utilized, and, in addition to the aliphatic diols mentioned for the crystalline polyester, there can be employed for example bisphenol-A, a bisphenol-A/ethylene oxide addition product, a bisphenol-A/propylene oxide addition product, hydrogenated bisphenol-A, bisphenol-S, a bisphenol-S/ethylene oxide addition product or a bisphenol-S/propylene oxide addition product. Also in the amorphous polyester resin, each of the acid-derived component and the alcohol-derived component may include plural components.

In the color toner receptive layer 11c, it is also preferable to add wax, inorganic fine particles or organic fine particles in addition to the thermoplastic resin.

It is however constituted of the thermoplastic resin preferably with a proportion of 70 wt. % or higher. This is because a proportion less than 70 wt. % may result in drawbacks such as an increased viscosity or a deteriorated heat resistance.

It is particularly preferabe to add inorganic fine particles in an amount of 3 to 30 wt. %.

Such inorganic fine particles are not particularly restricted as long as the whiteness is not deteriorated, and can be suitably selected from known fine particles. The particles can be made, for example, of silica, titanium dioxide, barium sulfate, or calcium carbonate. Also in consideration of dispersibility in the resin, such inorganic fine particles may be subjected to a hydrophobic treatment for example with a silane coupling agent or a titanium coupling agent.

The inorganic fine particles particularly preferably have an average particle size of 0.005 to 1 μm. An average particle size less than 0.005 μm may cause agglomeration when then are mixed with the resin, thereby becoming incapable of exhibiting the desired effect. On the other hand, a size exceeding 1 μm renders it difficult to obtain an image of a high luster.

An amount of addition less than 3 wt. % scarcely provides an effect of accelerating solidification, while an amount exceeding 30 wt. % increases the viscosity at the fixing temperature, thereby becoming incapable of forming a highly glossy image surface at a desired fixing temperature.

The inorganic fine particles further preferably are principally constituted of titanium dioxide or silica with a particle size of 8 to 400 nm. Such inorganic fine particles do not deteriorate whiteness and can expedite solidification even at a low amount of addition.

The solidification of the resin can also be accelerated by an addition of organic fine particles.

Such organic fine particles are not particularly restricted as long as the whiteness is not deteriorated, and can be suitably selected from known fine particles. The particles can be made, for example, of a polyester resin, a polystyrene resin, talc, caolin clay, a polyacrylic resin, a vinyl polymer resin, a polycarbonate resin, a polyamide resin, a polyimide resin, an epoxy resin, a polyurea resin or a fluorinated resin.

The organic fine particles particularly preferably have an average particle size of 0.005 to 1 μm. An average particle size less than 0.005 μm may cause agglomeration when then are mixed with a resin, thereby becoming incapable of exhibiting the desired effect. On the other hand, a size exceeding 1 μm renders it difficult to obtain an image of a high luster.

A wax is not particularly restricted in the composition as long as the effect of the present embodiment is hindered, and can be suitably selected from known materials employed as wax, for example formed from a polyethylene resin or carnauba natural wax. It is preferred that wax of a melting point within a range from 80 to 110° C. is added with a proportion equal to or higher than 0.2 wt. % but less than 8 wt. %.

A method of mixing the resin, the inorganic fine particles and other additives constituting the color toner receptive layer 11c is not particularly restricted as long as the inorganic fine particles and other additives can be uniformly dispersed in the resin, and can be a known mixing method.

For example, there can be employed a method of blending the inorganic fine particles and other additives into the molten resin with an extrusion kneader, or a method of charging the resin, the inorganic fine particles, other additives and a surfactant in water and mixing these under a high speed agitation. In particular, melt mixing is preferred for the purpose of uniformly dispersing the inorganic fine particles and other additives uniformly in the resin.

Also coating method for the color toner receptive layer 11c is not particularly restricted as long as a uniform and smooth color toner receptive layer 11c can be obtained.

For example, there can be utilized an apparatus based on a melt extrusion method which also serves to uniformly disperse the white pigment and other additives in the resin.

The melt extrusion method includes a laminating method in which a molten resin film, extruded from a heated extruder through a wide slid die (so-called T-die), is contacted with the light scattering layer 11b on the base paper 11a and continuously laminated by a pressing roller, and a method in which the molten resin is extruded on a cooled roller and wound up as a film, which is then provided on the light scattering layer 11b by a laminating apparatus.

The melt extrusion method allows to easily form a uniform film, constituted of the resin, the inorganic fine particles and other additives mentioned above, on the light scattering layer 11b on the base paper 11a.

It is also possible to melt-mix the crystalline polyester resin and the amorphous resin under a predetermined condition and to form a film by a melt extrusion method by mixing such resin and other additives. However, in such case, the condition of melt extrusion has to be so determined as to avoid a situation where an excessively high melt fusion temperature or an excessively long time promotes the mixing further, thereby failing to achieve the desired characteristics. More specifically, the extrusion has to be made within a short time at a temperature lower than that of the melt mixing.

In the melt extrusion method, it is also possible to achieve melt mixing of the crystalline polyester resin and the amorphous resin under a predetermined condition. A uniform film of the desired characteristics can be obtained with the melt extrusion method by charging the resin and the additives in an apparatus set at a melting temperature and an extrusion time so as to obtain desired characteristics.

The extruder to be employed for forming the transfer layer by the melt extrusion method can be of one-axis type or two-axis type, but is required to have an ability capable of uniformly mixing the inorganic fine particles and other additives in the resin. It is also possible to coat an aqueous dispersion obtained by dispersing the resin, the inorganic fine particles and other additives in water, by a known method such as with a roll coater, a bar coater or a spin coater.

The image supporting material 11 of the present embodiment is required to have a base paper 11a, a light scattering layer 11b and a color toner receptive layer 11c, but it may also be provided with another layer.

Figure 5A:
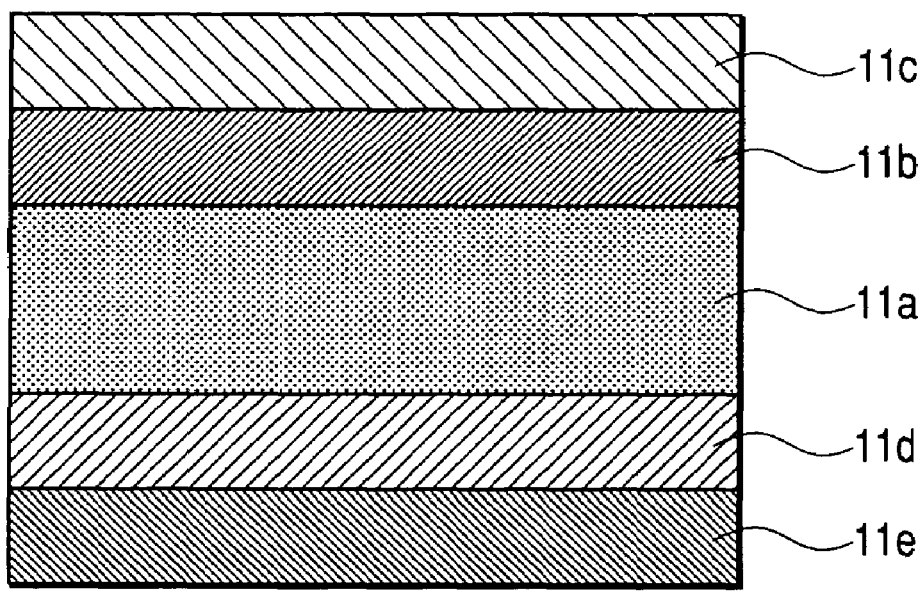
FIGS. 5A and 5B are schematic views showing a cross-sectional view of a variation of the image supporting material of the embodiment.

For example, as shown in FIG. 5A the image supporting material 11 may be provided with a reinforcing layer 11d constituted of a polyethylene resin layer on the rear surface of the base paper 11a, and an antistatic layer 11e on an outside thereof.

Such image supporting material 11 of the embodiment has advantages of a high whiteness, a smooth surface with a high luster, absence of see-through even in case an image is formed on the back side, also providing a smooth image with a clear color and with satisfactory granularity, a satisfactory conveying property of the image supporting material 11 and a reduced dust deposition.

The antistatic layer 11e is provided for maintaining a surface resistance of the back side at about $10^6$ to $10^{10}$ $\Omega/cm^2$, and is not particularly restricted as long as such objective can be attained.

For example, there can be employed a layer formed by coating colloidal silica or colloidal alumina, a layer formed by coating particles of silica or alumina mixed with a small amount of a binder resin, or a layer formed by coating a resin in which an ionic surfactant is dispersed.

Figure 5B:
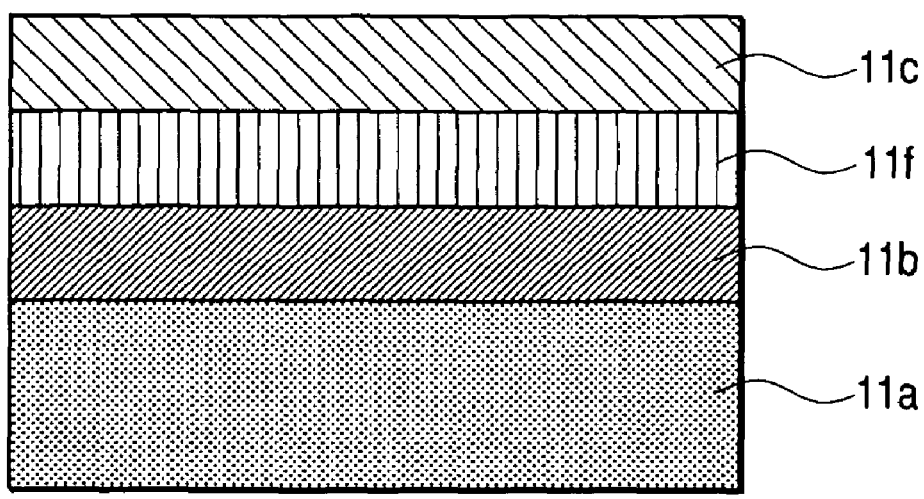

It is also preferable that the image supporting material 11 has, as shown in FIG. 5B a gelatin layer 11f between the light scattering layer 11b and the color toner receptive layer 11c.

This embodiment has an effect of improving the adhesion between the color toner receptive layer 11c and the light scattering layer 11b. The gelatin layer 11f is effective in forming a uniform color toner receptive layer 11c, particularly in case the color toner receptive layer 11c is formed by coating an aqueous dispersion of constituent materials.

Also in the present embodiment, the aforementioned color toner is insulating particles containing at least a thermoplastic binder resin and a colorant, and is formed as yellow toner, magenta toner, cyan toner or black toner.

The binder resin can be suitably selected according to the purpose, and can be a known resin employed in an ordinary toner, such as a polyester resin, a polystyrene resin, a polyacrylic resin, another vinyl polymer, a polycarbonate resin, a polyamide resin, a polyimide resin, an epoxy resin, or a polyurea resin, or a copolymer thereof. Among these, a polyester resin or a resin formed by a styrene-acrylic copolymer is preferred in realizing toner characteristics such as a low-temperature fixing property, a fixing strength and a storage stability.

Also for simultaneously attaining a low-temperature fixing property, a mechanical strength and a heat resistance, the binder resin is preferably constituted of two resins, namely a crystalline polyester resin and an amorphous resin which is formed by a styrene-acrylic copolymer or a polyester. The crystalline polyester resin can be similar to that employed in the toner receptive layer of the image supporting material. Also in consideration of the surface smoothness, it preferably has a composition similar to that of the crystalline polyester layer employed in the toner receptive layer (molecular weight and composition ratio being suitably changeable). The color toner utilizing such binder resin can simultaneously satisfy the low-temperature fixing property, mechanical strength and heat resistance, also can prevent an excessive enlargement (mechanical dot gain) of a color toner image in the fixing step, and can provide an image preferable in image quality such as a gradational reproducibility, a resolution or a granularity.

The binder resin preferably has a weight-averaged molecular weight of 5,000 to 40,000 and a glass transition point of 50 to 75° C.

Coloring materials ordinarily employed in preparing a color image can be used for the aforementioned colorant.

There can be employed a pigment-type colorant or a dye-type colorant, but a pigment-type colorant is preferable in consideration of light fastness. The colorant for Y (yellow) color can for example be benzidine yellow, quinoline yellow or Hanza yellow, that for M (magenta) color can be rhodamine B, rose bengal or pigment red, that for C (cyan) color can be phthalocyanine blue, aniline blue or pigment blue, and that for K (black) color can be carbon black, aniline black or a mixture of color pigments.

For widening the color reproduction range, it is important to suppress a random reflection at an interface between the colorant pigment and the binder, and a combination with a colorant formed by a highly dispersed pigment of a small particle size as disclosed in JP-A No. 4-242752 is effective.

Also an optimum amount of the colorant in the toner is variable since the spectral absorption characteristics and the developed color are different according to the type of the colorant. It should be suitably determined within a general range of 3 to 10 wt. % in consideration of the color reproduction range.

Also wax is preferably added to the color toner.

The wax is not particularly restricted in the composition as long as the effect of the present embodiment is hindered, and can be suitably selected from known materials employed as wax, for example formed from a polyethylene resin or carnauba natural wax. It is preferred that wax of a melting point within a range from 80 to 110° C. is added with a proportion equal to or higher than 2 wt. % but less than 8 wt. %.

A particle size of the color toner need not be particularly restricted, but is preferably within a range of 4 to 8 μm for obtaining an image satisfactory in granularity and gradation.

It becomes necessary to control fluidity and charging property of the toner, in order to obtain an image satisfactory in granularity and gradational reproducibility. For this purpose, inorganic fine particles and/or fine resin particles are preferably externally added or adhered to the surface of the color toner.

Such inorganic fine particles are not particularly restricted as long as the effect of the present invention is not hindered, and can be suitably selected from fine particles known as an external additive. The particles can be made of, for example, silica, titanium dioxide, tinoxide, or molybdenum oxide. Also in consideration of the stability of the charging property etc., such inorganic fine particles may be subjected to a hydrophobic treatment for example with a silane coupling agent or a titanium coupling agent.

Such organic fine particles are not particularly restricted as long as the effect of the present embodiment is not hindered, and can be suitably selected from fine particles known as an external additive. The particles can be formed, for example, by a polyester resin, a polystyrene resin, a polyacrylic resin, a vinylic resin, a polycarbonate resin, a polyamide resin, a polyimide resin, an epoxy resin, a polyurea resin or a fluorinated resin.

The inorganic fine particles and the organic fine particles particularly preferably have an average particle size of 0.005 to 1 μm. An average particle size less than 0.005 μm may cause agglomeration when the inorganic fine particles and/or the resin fine particles are adhered to the toner surface, thereby becoming incapable of exhibiting the desired effect. On the other hand, a size exceeding 1 μm renders it difficult to obtain an image of a high luster.

Also the thermoplastic resin of the color toner preferably has a temperature $T_2$, at which viscosity thereof becomes $10^4$ Pa·s, equal to or higher than $T_1$ (at which the viscosity of the color toner receptive layer 11c becomes $10^3$ Pa·s) but is lower than $T_1+20$ (° C.). Further, it is preferably constituted principally of a resin formed by two resins, namely a crystalline polyester resin and an amorphous styrene-acrylic or polyester resin. Also in consideration of the smoothness of the fixed image, it preferably has a composition similar to that of the resin in the toner receptive layer 11c (molecular weight and composition ratio being suitably changeable).

In case the temperature $T_2$, at which viscosity thereof becomes $10^4$ Pa·s, is higher, by more than 20° C., than the temperature $T_1$ at which the viscosity of the color toner receptive layer 11c becomes $10^3$ Pa·s, there is encountered a drawback of bubble generation in the vicinity of an image edge portion at a boundary of a high density solid image area with a large developed color toner amount and a non-image area without a color toner image. On the other hand, in case $T_2$ is less than $T_1$, the color toner image may be perturbed in an intermediate density area to cause a thickened line or an unresolved character.

The aforementioned color toner is used by forming a developer in combination with a suitably selected known carrier. It can also be used as a one-component developer by forming a charged toner by frictional charging with a developing sleeve or a charging member, for developing an electrostatic latent image.

Also in the present embodiment, a toner image forming apparatus of a known electrophotographic process can be employed as the image forming unit 30.

For example, there can be employed an embodiment including a photosensitive member, a charging apparatus opposed to the photosensitive member, an exposure apparatus for exposing the photosensitive member, an image signal forming apparatus for controlling an image signal for forming a color image, a developing apparatus opposed to the photosensitive member and a transfer apparatus for transferring a toner image on the photosensitive member onto an image supporting material 11.

There can also be employed an embodiment provided with an intermediate transfer member, in which a toner image on the photosensitive member is once transferred onto the intermediate transfer member and is then transferred, by a secondary transfer apparatus, from the intermediate transfer member onto the image supporting material 11.

The photosensitive member is not particularly restricted but can be a known one, which can be of a single-layered type or a functionally separated multi-layered type. It may be formed with an inorganic material such as selenium or amorphous silicon, or an organic material.

The charging apparatus can utilize already known charging means, for example, a contact charging employing a roller, a brush, a film or a rubber blade of conductive or semi-conductive property, a corotron charging employing a corona discharge, or a scorotron charging.

The exposure apparatus can utilize already known exposure means such as a laser scanning apparatus (ROS: raster output scanner) including a scanning apparatus and an optical system, or an LED head. It is preferable to employ a ROS or a LED head, in a preferred embodiment of forming an exposed image of a high resolution.

The image signal forming apparatus can utilize any known means capable of forming a signal so as to develop a toner image on a desired position of the image supporting material 11.

The developing apparatus can be any known developing apparatus of one-component or two-component development type, capable of forming a uniform toner image of a high resolution on the photosensitive member. In order to obtain a smooth gradation with satisfactory granularity, a developing apparatus of two-component development is preferred.

The transfer apparatus (primary transfer apparatus in case of the intermediate transfer process) can utilize known charging means, for example, means which forms an electric field between the photosensitive member and the image forming material 11 or the intermediate transfer member by a roller, a brush, a film or a rubber blade of conductive or semi-conductive property thereby transferring a toner image formed by charged toner particles, or means for corona charging the rear surface of the image supporting material 11 or the intermediate transfer member with a corotron charger or a scorotron charger utilizing corona discharge, thereby transferring a toner image formed by charged toner particles.

The intermediate transfer member can be formed with an insulating or semi-conductive belt or a drum-shaped member having an insulating or semi-conductive surface. A semi-conductive belt is preferable for maintaining a transfer property in a continuous image formation and for realizing a compact apparatus. For such belt, there is known a belt made of a resinous material in which conductive filler such as carbon fibers is dispersed. For example a polyimide resin is preferable for such resinous material.

The secondary transfer apparatus can utilize known charging means, for example, means which forms an electric field between the intermediate transfer member and the image forming material 11 by a roller, a brush, a film or a rubber blade of conductive or semi-conductive property thereby transferring a toner image comprising charged toner particles, or means for corona charging the rear surface of the intermediate transfer member with a corotron charger or a scorotron charger utilizing corona discharge, thereby transferring a toner image comprising charged toner particles.

The fixing apparatus 40 can be suitably selected, but is preferably provided with a heat-pressurizing apparatus including a belt-shaped fixing member (fixing belt 41) and applying heat and pressure to the image on the image supporting material 11 with the belt-shaped fixing member, and a cool-peeling apparatus for cooling and peeling the material after such heating and pressurizing.

The belt-shaped fixing member can be formed with a resin film such as of polyimide, or a metal film such as of stainless steel. Because a high heat resistance and a satisfactory releasing property are required, a member formed by a heat resistant base material laminated with a releasing layer is preferred. The base material is preferably formed by a resinous film such as of polyimide resin or polyethylene terephthalate resin, or a metal belt such as of stainless steel. Also the releasing layer is preferably formed by silicone rubber, fluorinated rubber or fluorinated resin.

In order to maintain a stable releasing property and to reduce stains for examples with dust, a resistance control is preferably realized by dispersing a conductive additive such as conductive carbon particles or a conductive polymer.

The belt-shaped fixing member may have a sheet shape, but preferably has an endless belt shape. Also in consideration of smoothness, it preferably has a surface luster of 60 or higher, when measured with a 75° luster meter.

The heat-pressurizing apparatus can be formed by an already known apparatus.

For example, there can be employed an apparatus which drives a belt-shaped fixing member and an image supporting material 11 bearing an image, between a pair of rollers driven at a constant speed.

In such apparatus, either roller or both rollers are provided with a heat source therein and are heated to a temperature capable of fusing the color toner and the resin of the color toner receptive layer, and the two rollers are mutually pressed. Preferably, either roller or both rollers are provided with a superficial layer of silicone rubber or fluorinated rubber, to form a heat-pressurizing area of a length of 1-8 mm.

The heated roller and the pressure roller at the fixing are preferably regulated at such a surface temperature at a rear end of the contact area of both rollers (at the exit end of fixing nip) that the color toner receptive layer 11c has a viscosity of $10^2$ to $10^4$ Pa·s.

The cool-peeling apparatus can be of a type which cools the image supporting material 11, heated and pressurized by a belt-shaped fixing member, and peels off the image supporting material 11 with a peeling member.

In such case, the cooling may be achieved by spontaneous cooling, but, in consideration of the dimension of the apparatus, the cooling is preferably accelerated by a cooling member such as a heat sink or a heat pipe. Also for such peeling, there can be employed an embodiment of inserting a peeling finger between the belt-shaped fixing member and the image supporting material 11, or an embodiment of providing a roller of a small radius of curvature (peeling roller) at a peeling position.

Also the conveying apparatus 50 for conveying the image supporting material 11 to the fixing apparatus 40 can be constituted of a known conveying apparatus.

As a constant conveying speed is preferable, there can be employed an apparatus for conveying the image supporting material 11 between a pair of rubber rollers rotated at a constant revolution, or an apparatus supporting a rubber belt or the like between a pair of rollers one of which is driven by a motor at a constant speed and conveying the image supporting material 11 at a constant speed on such rubber belt.

Particularly in case an unfixed toner image is formed, the latter apparatus is preferable in order not to disturb such toner image.

In the following, the image forming apparatus shown in FIG. 2 will be explained in more details.

Referring to FIG. 2, an image forming unit 30 is provided, around a photosensitive drum 31, with a charger not shown, an exposure apparatus 33 for scanning an original 32 and forming an electrostatic latent image on the photosensitive drum 31, a rotary developing apparatus 34 mounted with developing devices 34a-34d respectively containing toners of yellow, magenta, cyan and black colors, an intermediate transfer belt 35 for temporarily supporting an image from the photosensitive drum 31 and an unillustrated cleaning apparatus for eliminating a residual toner on the photosensitive drum 31. In a position of the intermediate transfer belt 35 opposed to the photosensitive drum 31, a primary transfer apparatus (for example a transfer corotron) 36 is provided, and at the position of the intermediate transfer belt 35 where an image supporting material 11 passes, a secondary transfer apparatus 37 (in the present embodiment formed by a transfer roller 37a and a backup roller 37b positioned across the intermediate transfer belt 35 and the image supporting material 11) is provided.

The exposure apparatus 33 irradiates the original 32 with a light from an illuminating lamp 331, then executes a color separation on the light reflected from the original 32 in a color scanner 332 and image processing in an image processing apparatus 333, and irradiates an exposure point of the photosensitive drum 31 with a light for writing an electrostatic latent image through a laser diode 334 and an optical system 335.

The fixing apparatus 40 is provided with a fixing belt (for example a belt superficially coated with silicone rubber) 41 supported by a suitable number (3 in the embodiment) of tension rollers 42-44, a heating roller 42 comprising a tension roller at the entrance side of the fixing belt 41 and so constructed as capable of heating, a peeling roller 44 comprising a tension roller at the exit side of the fixing belt 41 and so constructed as capable of peeling the image supporting material 11, a pressure roller (capable of containing a heat source if necessary) 46 opposed and pressed to the heating roller 42 across the fixing belt 41, and a heat sink 47 provided inside the fixing belt 41 and serving as a cooling member for cooling the fixing belt 41 in the course thereof from the heating roller 42 to the peeling roller 44.

A conveying apparatus 50 comprising for example a conveyor belt is provided between the fixing apparatus 40 and an image forming position of the image forming unit 30.

In the following, functions of the image forming apparatus of the present embodiment will be explained.

In case of forming a color copy with the image forming apparatus of the present embodiment as shown in FIG. 2, the original 32 to be copied is irradiated with a light from the illuminating lamp 331, and image data of plural colors of the color toners obtained by a color separation of the reflected light by the color scanner 332 and an image processing for color correction in the image processing apparatus 333 are converted into modulated laser beams for respective colors from the laser diode 334.

The photosensitive drum 31 is irradiated with such laser beam plural times to form plural electrostatic latent images. Such plural electrostatic latent images are developed in succession with a yellow developing device 34a, a magenta developing device 34b, a cyan developing device 34c, and a black developing device 34d, utilizing color toners of yellow, magenta, cyan and black colors.

The developed color toner images 12 (cf. FIG. 6) are transferred in succession, by the primary transfer apparatus (transfer corotron) 36, from the photosensitive drum 31 to the intermediate transfer belt 35, and the color toner images 12 of four colors transferred onto the intermediate transfer belt 35 are collectively transferred by the secondary transfer material 37 onto the image supporting material 11.

Figure 6:
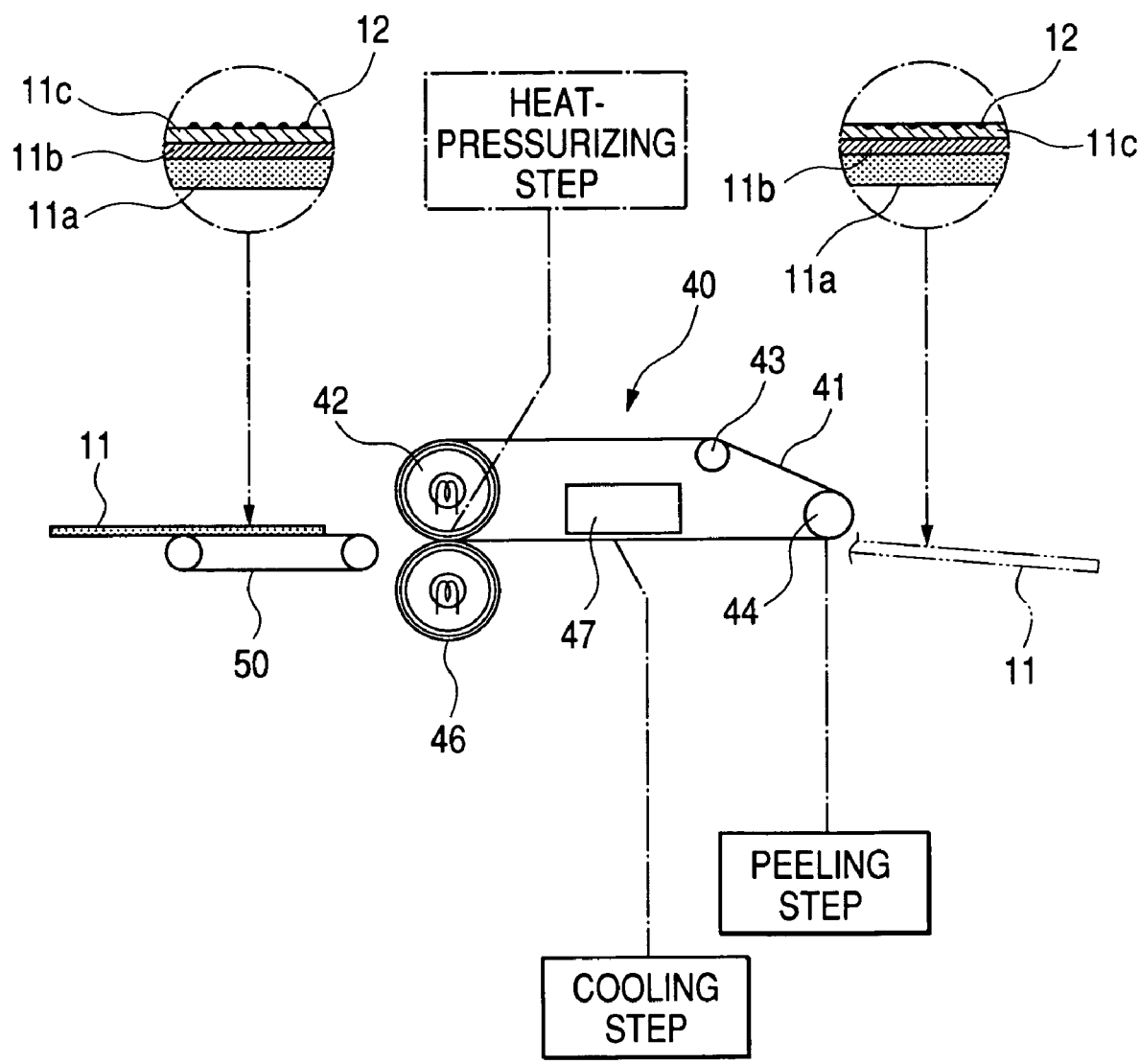
FIG. 6 is a schematic view showing an image fixing process in the embodiment.

Thereafter, the image supporting material 11 bearing the transferred color toner images 12 is conveyed through the conveying apparatus 50 to the fixing apparatus 40 as shown in FIG. 6.

In this state, the color toner images 12 are supported in a state where unfixed particles are piled up (with surface irregularities) on the color toner receptive layer 11c of the image supporting material 11.

In the following, functions of the fixing apparatus 40 will be explained. The heating roller 42 and the pressure roller 46 are heated in advance to a fusing temperature of the toner. Also the rollers 42, 46 are mutually pressed for example under a load of 100 kg. The rollers 42, 46 are driven in rotation, thus driving the fixing belt 41.

The fixing belt 41 comes into contact, at a nip between the heating roller 42 and the pressure roller 46, with the surface of the image supporting material 11 bearing the transferred color toner images 12, thereby heat fusing the color toner images 12 (heat-pressurizing step).

In this operation, since the light scattering layer 11b and the color toner receptive layer 11c of the image supporting material 11 and the color toner images 12 have fusing characteristics selected within a preferable range, the color toner images 12 are completely embedded in the color toner receptive layer 11c as shown in FIG. 6 and the highly smooth surface shape of the fixing belt 41 is directly replicated onto the color toner receptive layer 11c constituting the surface of the image supporting material 11.

Then the image supporting material 11 and the fixing belt 41 are conveyed, in a state mutually adhered by a fused toner layer, to the peeling roller 44, and, during such conveying, the fixing belt 41, the color toner images 12 and the image supporting material 11 are cooled by the heat sink 47 (cooling step).

Consequently, when the image supporting material 11 reaches the peeling roller 44, the color toner images 12 and the image supporting material 11 are integrally peeled off from the fixing belt 41 by the curvature of the peeling roller 44 (peeling step).

Thus a smooth color image of a high luster is formed on the image supporting material 11.

Such performances will be verified by the following examples.

EXAMPLES

In the following, there will be explained crystalline polyester resins A-G and amorphous resins H-L to be employed in the color toner receptive layer and the color toner in following examples 1-8 and comparative examples 1-5.

Preparation of Crystalline Polyester Resin

Crystalline polyester resin A: sebacic acid/ND/BPA=100/95/5 (molar ratio):

wherein ND indicates nonanediol and BPA indicates bisphenol-A/ethylene oxide addition product.

In a 3-necked flask dried by heating, 202 parts by weight of sebacic acid, 152 parts by weight of 1,9-nonanediol, 15.8 parts by weight of bisphenol-A/ethylene oxide addition product and 0.15 parts by weight of dibutyl tin oxide as a catalyst were charged, and, after the interior of the container was changed to an inert atmosphere by evacuation and replacement with nitrogen, were mechanically agitated for 5 hours at 180° C.

Then the mixture was gradually heated to 250° C. under a reduced pressure, agitated for 2 hours, and, upon reaching a viscous state, air cooled to terminate the reaction thereby obtaining a crystalline polyester resin A.

In a molecular weight measurement (converted to polystyrene) by gel permeation chromatography, the obtained crystalline polyester resin A showed a weight-averaged molecular weight (Mw) of 22,000 and a number-averaged molecular weight (Mn) of 11,000.

Also in a melting point (Tm) measurement by the aforementioned measuring method with the differential scanning calorimeter (DSC), the crystalline polyester resin A showed a clear peak with a peak top temperature at 72° C.

Crystalline polyester resin B: dodecanedioic acid/ND/BPS=100/95/5 (molar ratio):

wherein BPS indicates bisphenol-S/ethylene oxide addition product.

In a 3-necked flask dried by heating, 230 parts by weight of dodecanedioic acid, 152 parts by weight of 1,9-nonanediol, 16.9 parts by weight of bisphenol-S/ethylene oxide addition product and 0.15 parts by weight of dibutyl tin oxide as a catalyst were charged, and, after the interior of the container was changed to an inert atmosphere by evacuation and replacement with nitrogen, were mechanically agitated for 5 hours at 180° C.

Then the mixture was gradually heated to 250° C. under a reduced pressure, agitated for 2 hours, and, upon reaching a viscous state, air cooled to terminate the reaction there by obtaining a crystalline polyester resin B.

In a molecular weight measurement (converted to polystyrene) by gel permeation chromatography, the obtained crystalline polyester resin B showed a weight-averaged molecular weight (Mw) of 23,000 and a number-averaged molecular weight (Mn) of 12,000.

Also in a melting point (Tm) measurement by the aforementioned measuring method with the differential scanning calorimeter (DSC), the crystalline polyester resin B showed a clear peak with a peak top temperature at 74° C.

Crystalline polyester resin C: sebacic acid/ethylene glycol/BPS=100/95/5 (molar ratio):

In a 3-necked flask dried by heating, 202 parts by weight of sebacic acid, 62 parts by weight of ethylene glycol, 31.6 parts by weight of bisphenol-S/ethylene oxide addition product and 0.15 parts by weight of dibutyl tin oxide as a catalyst were charged, and, after the interior of the container was changed to an inert atmosphere by evacuation and replacement with nitrogen, were mechanically agitated for 5 hours at 180° C.

Then the mixture was gradually heated to 250° C. under a reduced pressure, agitated for 2 hours, and, upon reaching a viscous state, air cooled to terminate the reaction thereby obtaining a crystalline polyester resin C.

In a molecular weight measurement (converted to polystyrene) by gel permeation chromatography, the obtained crystalline polyester resin C showed a weight-averaged molecular weight (Mw) of 22,000 and a number-averaged molecular weight (Mn) of 11,000.

Also in a melting point (Tm) measurement by the aforementioned measuring method with the differential scanning calorimeter (DSC), the crystalline polyester resin C showed a clear peak with a peak top temperature at 72° C.

Crystalline polyester resin D: sebacic acid/butanediol=100/100 (molar ratio):

In a 3-necked flask dried by heating, 202 parts by weight of sebacic acid, 90 parts by weight of 1,4-butanediol, and 0.15 parts by weight of dibutyl tin oxide as a catalyst were charged, and, after the interior of the container was changed to an inert atmosphere by evacuation and replacement with nitrogen, were mechanically agitated for 5 hours at 180° C.

Then the mixture was gradually heated to 250° C. under a reduced pressure, agitated for 2 hours, and, upon reaching a viscous state, air cooled to terminate the reaction thereby obtaining a crystalline polyester resin D.

In a molecular weight measurement (converted to polystyrene) by gel permeation chromatography, the obtained crystalline polyester resin D showed a weight-averaged molecular weight (Mw) of 24,000 and a number-averaged molecular weight (Mn) of 13,000.

Also in a melting point (Tm) measurement by the aforementioned measuring method with the differential scanning calorimeter (DSC), the crystalline polyester resin D showed a clear peak with a peak top temperature at 68° C.

Crystalline polyester resin E: dodecandioic acid/hexanediol=100/100 (molar ratio):

In a 3-necked flask dried by heating, 230 parts by weight of dodecandioic acid, 90 parts by weight of 1,6-hexanediol, 136 parts by weight of ethylene glycol and 0.15 parts by weight of dibutyl tin oxide as a catalyst were charged, and, after the interior of the container was changed to an inert atmosphere by evacuation and replacement with nitrogen, were mechanically agitated for 5 hours at 180° C.

After methanol generated in the reaction and excessive ethylene glycol were distilled off under a reduced pressure, the mixture was gradually heated to 250° C. under a reduced pressure, agitated for 2 hours, and, upon reaching a viscous state, air cooled to terminate the reaction thereby obtaining a crystalline polyester resin E.

In a molecular weight measurement (converted to polystyrene) by gel permeation chromatography, the obtained crystalline polyester resin E showed a weight-averaged molecular weight (Mw) of 30,000 and a number-averaged molecular weight (Mn) of 14,000.

Also in a melting point (Tm) measurement by the aforementioned measuring method with the differential scanning calorimeter (DSC), the crystalline polyester resin E showed a clear peak with a peak top temperature at 75° C.

Crystalline polyester resin F: succinic acid/ethylene glycol=100/100 (molar ratio):

In a 3-necked flask dried by heating, 118 parts by weight of succinic acid, 62 parts by weight of ethylene glycol, and 0.15 parts by weight of dibutyl tin oxide as a catalyst were charged, and, after the interior of the container was changed to an inert atmosphere by evacuation and replacement with nitrogen, were mechanically agitated for 5 hours at 180° C.

Then the mixture was gradually heated to 250° C. under a reduced pressure, agitated for 2 hours, and, upon reaching a viscous state, air cooled to terminate the reaction thereby obtaining a crystalline polyester resin F.

In a molecular weight measurement (converted to polystyrene) by gel permeation chromatography, the obtained crystalline polyester resin F showed a weight-averaged molecular weight (Mw) of 22,000 and a number-averaged molecular weight (Mn) of 10,900.

Also in a melting point (Tm) measurement by the aforementioned measuring method with the differential scanning calorimeter (DSC), the crystalline polyester resin F showed a clear peak with a peak top temperature at 102° C.

Crystalline polyester resin G: adipic acid/xylylene glycol=100/100 (molar ratio):

In a 3-necked flask dried by heating, 146 parts by weight of adipic acid, 138 parts by weight of xylylene glycol, and 0.15 parts by weight of dibutyl tin oxide as a catalyst were charged, and, after the interior of the container was changed to an inert atmosphere by evacuation and replacement with nitrogen, were mechanically agitated for 5 hours at 180° C.

Then the mixture was gradually heated to 250° C. under a reduced pressure, agitated for 2 hours, and, upon reaching a viscous state, air cooled to terminate the reaction thereby obtaining a crystalline polyester resin G.

In a molecular weight measurement (converted to polystyrene) by gel permeation chromatography, the obtained crystalline polyester resin G showed a weight-averaged molecular weight (Mw) of 19,000 and a number-averaged molecular weight (Mn) of 9,000.

Also in a melting point (Tm) measurement by the aforementioned measuring method with the differential scanning calorimeter (DSC), the crystalline polyester resin G showed a clear peak with a peak top temperature at 86° C.

The prepared crystalline polyester resins A-G are listed in FIG. 7.

Preparation of Amorphous Resin

Amorphous resin H: TPA/ND/BPA=100/25/75 (molar ratio):

wherein TPA indicates dimethyl terephthalate.

In a 3-necked flask dried by heating, 194 parts by weight of dimethyl terephthalate, 40 parts by weight of 1,9-nonanediol, 237 parts by weight of bisphenol-A/ethylene oxide addition product and 0.15 parts by weight of dibutyltinoxide as a catalyst were charged, and, after the interior of the container was changed to an inert atmosphere by evacuation and replacement with nitrogen, were mechanically agitated for 5 hours at 180° C.

Then the mixture was gradually heated to 230° C. under a reduced pressure, agitated for 2 hours, and, upon reaching a viscous state, air cooled to terminate the reaction thereby obtaining an amorphous polyester resin H.

In a molecular weight measurement (converted to polystyrene) by gel permeation chromatography, the obtained amorphous polyester resin H showed a weight-averaged molecular weight (Mw) of 13,000 and a number-averaged molecular weight (Mn) of 6,000.

Also in a melting point (Tm) measurement by the aforementioned measuring method with the differential scanning calorimeter (DSC), the amorphous polyester resin H did not show a clear peak but stepwise changes in heat absorption. A glass transition point (Tg), determined by an intermediate point of the stepwise heat absorption changes, was 58° C.

Amorphous resin I: TPA/ND/BPA=100/15/85 (molar ratio):

In a 3-necked flask dried by heating, 194 parts by weight of dimethyl terephthalate, 47 parts by weight of 1,9-nonanediol, 136 parts by weight of bisphenol-A/ethylene oxide addition product and 0.15 parts by weight of dibutyl tin oxide as a catalyst were charged, and, after the interior of the container was changed to an inert atmosphere by evacuation and replacement with nitrogen, were mechanically agitated for 5 hours at 180° C.

Then the mixture was gradually heated to 230° C. under a reduced pressure, agitated for 2 hours, and, upon reaching a viscous state, air cooled to terminate the reaction thereby obtaining an amorphous polyester resin I.

In a molecular weight measurement (converted to polystyrene) by gel permeation chromatography, the obtained amorphous polyester resin I showed a weight-averaged molecular weight (Mw) of 12,000 and a number-averaged molecular weight (Mn) of 5,600.

Also in a melting point (Tm) measurement by the aforementioned measuring method with the differential scanning calorimeter (DSC), the amorphous polyester resin I did not show a clear peak but stepwise changes in heat absorption. A glass transition point (Tg), determined by an intermediate point of the stepwise heat absorption changes, was 62° C.

Amorphous resin J: TPA/BPA=100/100 (molar ratio):

In a 3-necked flask dried by heating, 194 parts by weight of dimethyl terephthalate, 316 parts by weight of bisphenol-A/ethylene oxide addition product and 0.15 parts by weight of dibutyl tin oxide as a catalyst were charged, and, after the interior of the container was changed to an inert atmosphere by evacuation and replacement with nitrogen, were mechanically agitated for 5 hours at 180° C.

Then the mixture was gradually heated to 230° C. under a reduced pressure, agitated for 2 hours, and, upon reaching a viscous state, air cooled to terminate the reaction thereby obtaining an amorphous polyester resin J.

In a molecular weight measurement (converted to polystyrene) by gel permeation chromatography, the obtained amorphous polyester resin J showed a weight-averaged molecular weight (Mw) of 13,000 and a number-averaged molecular weight (Mn) of 6,000.

Also in a melting point (Tm) measurement by the aforementioned measuring method with the differential scanning calorimeter (DSC), the amorphous polyester resin J did not show a clear peak but stepwise changes in heat absorption. A glass transition point (Tg), determined by an intermediate point of the stepwise heat absorption changes, was 82° C.

Amorphous resin K: TPA/BPA/CHDM=100/80/20 (molar ratio):

wherein CHDM indicates cyclohexanedimethanol.

In a 3-necked flask dried by heating, 194 parts by weight of dimethyl terephthalate, 253 parts by weight of bisphenol-A/ethylene oxide addition product, 28.8 parts by weight of cyclohexanedimethanol and 0.15 parts by weight of dibutyl tin oxide as a catalyst were charged, and, after the interior of the container was changed to an inert atmosphere by evacuation and replacement with nitrogen, were mechanically agitated for 5 hours at 180° C.

Then the mixture was gradually heated to 230° C. under a reduced pressure, agitated for 2 hours, and, upon reaching a viscous state, air cooled to terminate the reaction thereby obtaining an amorphous polyester resin K.

In a molecular weight measurement (converted to polystyrene) by gel permeation chromatography, the obtained amorphous polyester resin K showed a weight-averaged molecular weight (Mw) of 10,000 and a number-averaged molecular weight (Mn) of 4,500.

Also in a melting point (Tm) measurement by the aforementioned measuring method with the differential scanning calorimeter (DSC), the amorphous polyester resin K did not show a clear peak but stepwise changes in heat absorption. A glass transition point (Tg), determined by an intermediate point of the stepwise heat absorption changes, was 62° C.

Amorphous resin L: styrene/butyl acrylate/acrylic acid=100/57/3 (molar ratio):

A solution of:

| | |
|---|---|
| styrene | 328 parts by weight |
| n-butyl acrylate | 72 parts by weight |
| acrylic acid | 6 parts by weight |
| dodecanediol | 6 parts by weight |
| carbon tetrabromide | 4 parts by weight; |

6 parts by weight of a nonionic surfactant (Nonipol 400, manufactured by Sanyo Chemical Industries, Ltd.), and 10 parts an anionic surfactant (Neogen R, manufactured by Daiichi Chemical Industries Co.) were dissolved in 550 parts by weight of ion-exchanged water, charged in a flask and subjected to a dispersion-emulsification. Under slow agitation for 10 minutes, 50 parts by weight of ion-exchanged water in which 4 parts by weight of ammonium persulfate were added. Thereafter, after sufficient nitrogen replacement of the interior of the flask, the system was heated to 70° C. on an oil bath under agitation, and was subjected to a polymerization for 5 hours.

An obtained latex was lyophilized to obtain an amorphous resin L.

A glass transition point (Tg) of the resin, measured with a differential scanning calorimeter (DSC-50, manufactured by Shimadzu Corp.) at a temperature elevating rate of 10° C./sec, was 58° C., and a weight-averaged molecular weight (converted into polystyrene), measured with a molecular weight measuring device (HLC-8020, manufactured by Toso Co.) in THF as the solvent, was 33,000.

The prepared amorphous resins H-L are listed in FIG. 8.

Color toner developer

Color toner developer X:

One hundred parts by weight of a binder resin of a linear polymer obtained from dimethyl terephthalate/bisphenol-A ethylene oxide addition product/cyclohexanedimethanol (molar ratio=5:4:1, Tg=62° C., Mn=4,500, Mw=10,000) and a colorant of 5 parts by weight of benzidine yellow for a yellow toner, 4 parts by weight of pigment red for a magenta toner, 4 parts by weight of phthalocyanine blue for a cyan toner or 5 parts by weight of carbon black for a black toner, were mixed, subjected to melt-mixing under heating in a bambury mixer, crushed with a jet mill and classified in an air classifier to obtain fine particles with d50=7 μm.

To one hundred parts by weight of the fine particles, the following inorganic fine particles a, b were deposited in a high-speed mixer.

The inorganic fine particles a were constituted of $SiO_2$ (hydrophobic surface treated with a silane coupling agent, average particle size: 0.05 μm, amount of addition: 1.0 part by weight), and the inorganic fine particles b were constituted of $TiO_2$ (hydrophobic surface treated with a silane coupling agent, average particle size: 0.02 μm, refractive index: 2.5, amount of addition: 1.0 part by weight).

The toner had $T_2$ of 105° C.

A two-component developer was prepared by mixing 8 parts by weight of the toner with one hundred parts by weight of a carrier, the same as that in a black developer for A-color 635 (manufactured by Fuji Xerox Co.).

Color Toner Developer Y:

A resin particle dispersion, a releasing agent particle dispersion and a pigment dispersion were prepared in advance in the following manner.

Resin Particle Dispersion (1)

A solution of:

| | |
|---|---|
| styrene | 328 parts by weight |
| n-butyl acrylate | 72 parts by weight |
| acrylic acid | 6 parts by weight |
| dodecanediol | 6 parts by weight |
| carbon tetrabromide | 4 parts by weight; |

6 parts by weight of a nonionic surfactant (Nonipol 400, manufactured by Sanyo Chemical Industries, Ltd.), and 10 parts an anionic surfactant (Neogen R, manufactured by Daiichi Pharmaceutical Co.) were dissolved in 550 parts by weight of ion-exchanged water, charged in a flask and subjected to dispersion-emulsification. Under slow agitation for 10 minutes, 50 parts by weight of ion-exchanged water in which 4 parts by weight of ammonium persulfate were added. Thereafter, after sufficient nitrogen replacement of the interior of the flask, the system was heated to 70° C. on an oil bath under agitation, and was subjected to a polymerization for 5 hours.

An obtained latex showed a volume-averaged particle size (D50) of 200 nm in a measurement with a laser diffraction particle size measuring apparatus (LA-700, manufactured by Horiba, Ltd. ), a glass transition point (Tg) of 58° C. in a measurement with a differential scanning calorimeter (DSC-50, manufactured by Shimadzu Corp.) at a temperature elevating rate of 10° C./sec, and a weight-averaged molecular weight (converted into polystyrene) of 33,000 in a measurement with a molecular weight measuring device (HLC-8020, manufactured by Toso Co.) in a THF solvent.

Releasing Agent Particle Dispersion (1)

Following components:

| | |
|---|---|
| paraffin wax (HNP0190, melting point 85° C., manufactured by Nippon Seiro Co.) | 50 parts by weight |
| anionic surfactant (Neogen R, manufactured by Daiichi Pharmaceutical Co.) | 3 parts by weight |
| ion-exchanged water | 150 parts by weight | were sufficiently dispersed under heating at 95° C. in a homogenizer (Ultratalux T50, manufactured by IKA Corp.) and further dispersed in a pressure-discharge homogenizer to obtain a releasing agent dispersion in which the releasing agent particles had a volume-averaged particle size (D50) of 200 nm.

Pigment Dispersion (1)

Following components:

| | |
|---|---|
| copper phthalocyanine pigment (manufactured by BASF Inc.) | 50 parts by weight |
| anionic surfactant (Neogen R, manufacture by Daiichi Pharmaceutical Co.) | 8 parts by weight |
| ion-exchanged water | 150 parts by weight | were dispersed for 20 minutes in an ultrasonic disperser (W-113, manufactured by Honda Co.) to obtain a blue pigment dispersion of a volume-averaged particle size (D50) of 180 nm.

Pigment Dispersion (2)
Following components:

| | |
|---|---|
| pigment red 122 (manufactured by Daiichi Seika Co.) | 50 parts by weight |
| anionic surfactant (Neogen R, manufacture by Daiichi Pharmaceutical Co.) | 8 parts by weight |
| ion-exchanged water | 200 parts by weight | were dispersed for 10 minutes by a homogenizer (Ultratalux T50, manufactured by IKA Corp.) and dispersed for 30 minutes in an ultrasonic disperser (W-113, manufactured by Honda Co.) to obtain a blue pigment dispersion of a volume-averaged particle size (D50) of 150 nm.

Pigment Dispersion (3)
Following components:

| | |
|---|---|
| pigment yellow 180 (manufactured by Clariant Inc.) | 50 parts by weight |
| anionic surfactant (Neogen R, manufacture by Daiichi Pharmaceutical Co.) | 8 parts by weight |
| ion-exchanged water | 200 parts by weight | were dispersed for 10 minutes in a homogenizer (Ultratalux T50, manufactured by IKA Corp) and then dispersed for 30 minutes in an ultrasonic disperser (W-113, manufactured by Honda Co.) to obtain a yellow pigment dispersion of a volume-averaged particle size (D50) of 200 nm.

Pigment Dispersion (4)
Following components:

| | |
|---|---|
| carbon black (Mogul L, manufactured by Cabot Inc.) | 50 parts by weight |
| anionic surfactant (Neogen R, manufacture by Daiichi Pharmaceutical Co.) | 6 parts by weight |
| ion-exchanged water | 200 parts by weight | were dispersed for 20 minutes in an ultrasonic disperser (W-113, manufactured by Honda Co.) to obtain a blue pigment dispersion of a volume-averaged particle size (D50) of 200 nm.

Preparation of Agglomerate Particles
Following components:

| | |
|---|---|
| resin particle dispersion (1) | 260 parts by weight |
| releasing agent particle dispersion (1) | 40 parts by weight |
| any of pigment dispersions (1)-(4) | 40 parts by weight |
| polyaluminum chloride | 3 parts by weight | were charged in a round stainless steel flask, sufficiently mixed and dispersed by a homogenizer (Ultratalux T50, manufactured by IKA Corp.), then heated to 50° C. under agitation on an oil bath, further maintained at this temperature for 30 minutes, and maintained in temperature by raising the oil bath to 52° C., thereby obtaining agglomerate particles. The agglomerate particles had a volume-averaged particle size (D50) of 5.0 μm and a volume-averaged particle size distribution (GSDv) of 1.24 in a measurement with a Coulter counter (TAII, manufactured by Nikkaki Co.).

Deposition of Resin Particles
To the agglomerate particle dispersion, 70 parts by weight of the resin particle dispersion (1) were gradually added, and the mixture was agitated for 30 minutes under heating to deposit the resin particles to the surface of the agglomerate particles. The particles after deposition showed a volume-averaged particle size (D50) of 5.5 μm and a volume-averaged particle size distribution (GSDv) of 1.23.

Fusion/Uniting
The agglomerate particle dispersion was adjusted to a pH value of 5.0 by the addition of an aqueous solution of sodium hydroxide to stabilize the dispersion of the particles, and was then heated to 90° C. for achieving fusion/uniting by heating.

Alkali Treatment
The fusion/united particle dispersion was cooled to 70° C., then adjusted to a pH value 10 by the addition of sodium hydroxide and was heated for 1 hour for eliminating the surfactant.

First Rinsing With Purified Water
After the fusion/united particle dispersion after the alkali treatment was filtered to eliminate the liquid, the toner particles were rinsed with purified water of a 6-times amount and were filtered, and these operations were repeated three times. The filtrate at the third operation showed a conductivity of 78 uS/cm. Also a measurement of the dried toner particles with an XPS (ESCA lab-2220I-XL, manufactured by VG Inc.) showed a sodium amount of 1.3% on the particle surface with respect to the sum of carbon and oxygen.

Rinsing With Acidic Solution
After the first rinsing with purified water, the particles were again dispersed in purified water of an amount of six times, adjusted to a pH value 5 with nitric acid, further agitated and filtered.

Second Rising With Purified Water
The particles were rinsed by dispersing again in purified water of an amount of six times, and filtered. Thereafter, the particles were dried to obtain toner particles of four colors of the color toner developer Y.

The toner particles of the respective colors showed, in a measurement with a Coulter counter (manufactured by Coulter Inc.), a volume-averaged particle size (D50) of 5.4-5.6 μm and a volume-averaged particle size distribution (GSDv) of 1.23-1.25, and a glass transition point (Tg) of 57° C. in a measurement with a differential scanning calorimeter (DSC-50, manufactured by Shimadzu Corp.) at a temperature elevating rate of 10° C./sec.

To one hundred parts by weight of the fine particles, the following inorganic fine particles a, b were deposited in a high-speed mixer.

The inorganic fine particles a were constituted of $SiO_2$ (hydrophobic surface treated with a silane coupling agent, average particle size: 0.05 μm, amount of addition: 1.5 part by weight), and the inorganic fine particles b were constituted of $TiO_2$ (hydrophobic surface treated with a silane coupling agent, average particle size: 0.02 μm, refractive index: 2.5, amount of addition: 1.5 part by weight).

The toner had $T_2$ of 100° C.

A two-component developer was prepared by mixing 7 parts by weight of the toner with one hundred parts by weight of a carrier, the same as that in a color developer for DocuCenter Color 500 (manufactured by Fuji Xerox Co.).

Color toner developer Z:

Preparation of Resin Particle Dispersion (1)

150 parts by weight of the crystalline polyester resin B were added in 850 parts of distilled water, and mixed under agitation in Clare Mix (manufactured by Organo Ltd.) under heating at 140° C. to obtain a resin particle dispersion (1).

Preparation of Resin Particle Dispersion (2)

150 parts by weight of the amorphous resin H were added in 850 parts of distilled water, and mixed under agitation in Clare Mix (manufactured by Organo Ltd.) under heating at 140° C. to obtain a resin particle dispersion (2).

Preparation of Colorant Dispersion (1)

250 parts of a cyan pigment (ECB-301, manufactured by Dainichi Seika Co.), 20 parts of an anionic surfactant (Neogen R, manufactured by Daiichi Pharmaceutical Co.), and 730 parts of ion-exchanged water were mixed and dispersed with a homogenizer (Ultratalux T50, manufactured by IKA Corp.) to obtain a colorant dispersion (1) of a cyan pigment.

Preparation of Colorant Dispersion (2)

250 parts of a magenta pigment (ECR-186Y, manufactured by Dainichi Seika Co.), 20 parts of an anionic surfactant (Neogen R, manufactured by Daiichi Pharmaceutical Co.), and 730 parts of ion-exchanged water were mixed and dispersed in a similar manner as in the colorant dispersion (1) to obtain a colorant dispersion (2) of a magenta pigment.

Preparation of Colorant Dispersion (3)

250 parts of a yellow pigment (Hansa Brilliant Yellow 5GX03, manufactured by Clariant Japan Inc.), 20 parts of an anionic surfactant (Neogen R, manufactured by Daiichi Pharmaceutical Co.), and 730 parts of ion-exchanged water were mixed and dispersed in a similar manner as in the colorant dispersion (1) to obtain a colorant dispersion (3) of a yellow pigment.

Preparation of Colorant Dispersion (4)

250 parts of car bon black (Regal 330, manufactured by Cabot Inc.), 20 parts of an anionic surfactant (Neogen R, manufactured by Daiichi Pharmaceutical Co.), and 730 parts of ion-exchanged water were mixed and dispersed in a similar manner as in the colorant dispersion (1) to obtain a colorant dispersion (4) of carbon black.

Preparation of Releasing Agent Dispersion 350 parts of a releasing agent (Rikemal B-200, manufactured by Riken Vitamin Co., melt point: 68° C., 15 parts of an anionic surfactant (Neogen R, manufactured by Daiichi Pharmaceutical Co.), and 635 parts of ion-exchanged water were mixed, and dispersed with a homogenizer (Ultratalux T50, manufactured by IKA Corp.) under heating at 90° C. on a water bath to obtain a releasing agent dispersion.

Preparation of Electrophotographic Toner 800 parts of the resin particle dispersion (1), 800 parts of the resin particle dispersion (2), 52 parts of any one of the colorant dispersions (1)-(4), 66 parts of the releasing agent dispersion, 5 parts of calcium chloride (manufactured by Wako Pure Chemicals Inc.) and one hundred parts of ion-exchanged water were charged in a round stainless steel flask, then, after a pH regulation to 4.0, were dispersed with a homogenizer (Ultratalux T50, manufactured by IKA Corp.), and heated to 65° C. under agitation on an oil bath. After maintaining at 65° C. for 3 hours, an observation under an optical microscope proved formation of agglomerate particles of an average particle size of about 5.0 μm.

After agitation for further 1 hour at 65° C., an observation under an optical microscope proved formation of agglomerate particles of an average particle size of about 5.5 μm.

The agglomerate particle dispersion had a pH value of 3.8. The pH value was adjusted to 5.0 by a gradual addition of a 0.5 wt. % aqueous solution of sodium carbonate (manufactured by Wako Pure Chemical Co.). The agglomerate particle dispersion was heated to 80° C. under continued agitation and was maintained at this temperature for 30 minutes, and an observation under an optical microscope proved united spherical particles. Thereafter, the particles were solidified by cooling to 30° C. at a rate of 10° C./min, under addition of ion-exchanged water.

Thereafter, the reaction product was filtered, sufficiently rinsed with ion-exchanged water, and dried with a vacuum dryer to obtain electrophotographic toner particles.

The obtained toner particles showed, in a measurement with a Coulter counter TA-II (aperture diameter: 50 μm, manufactured by Coulter Inc.), a volume-averaged particle size of 5.5 μm and a number-averaged particle size 4.6 μm, and had a spherical shape in an observation under an optical microscope.

The toner particles were added with 0.8 wt. % of silica fine particles of an average primary particle size of 40 nm subjected to a superficial hydrophobic treatment (hydrophobic silica RX50, manufactured by Nippon Aerosil Co.) and 1.0 wt. % of a metatitanate compound particles of an average primary particle size of 20 nm, obtained as a reaction product of one hundred parts by weight of metatitanic acid with 40 parts by weight of isobutyltrimethoxysilane and 10 parts by weight of trifluoropropyltrimethoxysilane, for 5 minutes in a Henshel mixer. Thereafter the particles were classified with a sieve of 45 μm to obtain electrophotographic toner.

Such toners had $T_2$ of 80° C., a glass transition point (Tg) of 45° C. and Tm of 75° C.

Two-component developers of cyan, magenta, yellow and black colors were prepared by mixing 7 parts by weight of each toners with one hundred parts by weight of a carrier, the same as that in a color developer for DocuCenter Color 500 (manufactured by Fuji Xerox Co.).

Properties of the prepared color toner developers X-Z are shown in FIG. 9.

In FIG. 9, PES indicates polyester, and St-BA indicates styrene-n-butyl acrylate.

Example 1

Color Image Forming Apparatus

As the image forming apparatus, there was employed the image forming apparatus shown in FIG. 2. An image forming process speed was 160 mm/sec except for the fixing process. A weight ratio of the toner and the carrier, a charging potential of the photosensitive member, an exposure amount and a developing bias were so regulated as to obtain a development amount of the color toner of 0.5 mg/cm$^2$ in a solid image area.

Color Toner Developer

The color toner developer X was employed.

Image Supporting Material

Base Paper

A base of a thickness of 150 μm formed with pulps was employed.

Light Scattering Layer

One hundred parts by weight of polyethylene resin were mixed with 25 parts by weight of titanium dioxide (KA-10, particle size: 300-500 nm, manufactured by Titan Kogyo Co.), charged in a melt extruder heated at 200° C., discharged from a T-die and laminated to a flame treated surface of the base paper by nipping between a nip roller and a cooling roller to obtain a light scattering layer of a thickness of 30 μm. A film after extrusion from the T-die was subjected on both side to a corona discharge treatment in a corona treatment apparatus. The light scattering layer had Tb of 130° C.

Color Toner Receptive Layer 50 parts by weight of the crystalline polyester resin A and 50 parts by weight of the amorphous polyester resin H were subjected to melt-mixing for 10 minutes in an extrusion kneader heated at 230° C., and pellets prepared therefrom were charged in a melt extruder heated at 170° C., discharged from a T-die and laminated to the base paper, bearing the light scattering layer, by nipping between a nip roller and a cooling roller to obtain a color toner receptive layer of a thickness of 20 μm. In the melt-mixing of the resins, $T_0$=220° C. at $t_0$=5 minutes. The color toner receptive layer had $T_1$ of 75° C.

Preparation of Back Layer

A polyethylene resin was charged in a melt extruder heated at 200° C., then discharged from a T-die and laminated to a flame treated back surface of the base paper by nipping between a nip roller and a cooling roller to obtain a back polyethylene layer of a thickness of 30 μm. Then colloidal silica as an antistatic agent was coated thereon with a bar coater to form an antistatic layer. A film after extrusion from the T-die was subjected on both side to a corona discharge treatment in a corona treatment apparatus.

Belt Base Material

A belt base material was constituted of a polyimide film of a thickness of 80 μm, in which conductive carbon was dispersed and on which silicone rubber KE4895 (manufactured by Shinetsu Chemical Industries Ltd.) with a thickness of 50 μm were applied.

Each of the two heating rollers was constituted of an aluminum core material covered with a silicone rubber layer of a thickness of 2 mm, and was provided with a halogen lamp as a heat source at the center. The surface temperature was changed within a range of 100 to 170° C. in each roller.

The fixing speed was selected as 30 mm/sec.

The base material had a temperature of 70° C. at the peeling position.

A portrait photographic image was outputted in the apparatus described above.

The toner materials used were evaluated in the following manner.

The molecular weight was measured with a gel permeation chromatography, with a tetrahydrofuran solvent.

The average particle size of the toner was measured with a Coulter counter (manufactured by Coulter Inc.) and calculated as a weight-averaged particle size d50.

The viscosity of the resin was measured with a rheometer of rotary plate type (RDAII, manufactured by Rheometrics Inc.) with an angular velocity of 1 rad/sec.

The visual reflectance Y was measured in the following procedure (cf. FIG. 4).

The thermoplastic resin for forming the color toner receptive layer, obtained in each of the examples and the comparative examples, was coated on a color OHP sheet (manufactured by Fuji Xerox Co.) with the same thickness as in each example to obtain a transparent image.

The transparent image was sandwiched between cover glasses for microscopic observation, and gaps between the image and the cover glasses were filled with tetradecane.

It was then placed on a light trap and Y' was measured with X-rite 968.

Also an OHP sheet not coated with the thermoplastic resin was sandwiched between cover glasses for microscopic observation, and the gaps between the sheet and the cover glasses were filled with tetradecane, $Y_0$ was measured in a similar manner.

Y was calculated as $Y'-Y_0$.

Example 2

A color image was prepared in the same manner as in Example 1, except that the color toner receptive layer was changed in the following manner.

Color Toner Receptive Layer 40 parts by weight of the crystalline polyester resin B and 60 parts by weight of the amorphous polyester resin I were subjected to a melt-mixing for 10 minutes in an extrusion kneader heated at 240° C., and pellets prepared therefrom were charged in a melt extruder heated at 170° C., discharged from a T-die and laminated to the base paper, bearing the light scattering layer, by nipping between a nip roller and a cooling roller to obtain a color toner receptive layer of a thickness of 20 μm. In the melt-mixing of the resins, $T_0$=230° C. at $t_0$=5 minutes. The color toner receptive layer had $T_1$ of 78° C.

Example 3

A color image was prepared in the same manner as in Example 1, except that the color developer was changed to Y and the color toner receptive layer was changed in the following manner.

Color Toner Receptive Layer 50 parts by weight of the crystalline polyester resin C and 50 parts by weight of the amorphous polyester resin H were subjected to a melt-mixing for 10 minutes in an extrusion kneader heated at 250° C., and pellets prepared therefrom were charged in a melt extruder heated at 170° C., discharged from a T-die and laminated to the base paper, bearing the light scattering layer, by nipping between a nip roller and a cooling roller to obtain a color toner receptive layer of a thickness of 20 μm. In the melt-mixing of the resins, $T_0$=270° C. at $t_0$=5 minutes. The color toner receptive layer had $T_1$ of 75° C.

Example 4

A color image was prepared in the same manner as in Example 1, except that the color developer was changed to Y.

Example 5

A color image was prepared in the same manner as in Example 1, except that the color developer was changed to Z.

Example 6

A color image was prepared in the same manner as in Example 5, except that the color toner receptive layer was changed in the following manner.

Color Toner Receptive Layer 50 parts by weight of the crystalline polyester resin B and 50 parts by weight of the amorphous polyester resin L were subjected to a melt-mixing for 10 minutes in an extrusion kneader heated at 220° C., and pellets prepared therefrom were charged in a melt extruder heated at 170° C., discharged from a T-die and laminated to the base paper, bearing the light scattering layer, by nipping between a nip roller and a cooling roller to obtain a color toner receptive layer of a thickness of 20 μm. In the melt-mixing of the resins, Y did not become equal to or lower than 1.5 even when the temperature was elevated to 300° C. at $t_0=5$ minutes. The color toner receptive layer had $T_1$ of 79° C.

Example 7

A color image was prepared in the same manner as in Example 5, except that the color toner receptive layer was changed in the following manner.

Color Toner Receptive Layer 50 parts by weight of the crystalline polyester resin E and 50 parts by weight of the amorphous polyester resin K were subjected to a melt-mixing for 10 minutes in an extrusion kneader heated at 210° C., and pellets prepared therefrom were charged in a melt extruder heated at 170° C., discharged from a T-die and laminated to the base paper, bearing the light scattering layer, by nipping between a nip roller and a cooling roller to obtain a color toner receptive layer of a thickness of 20 μm. In the melt-mixing of the resins, $T_0$ was 270° C. at $t_0=5$ minutes. The color toner receptive layer had $T_1$ of 78° C.

Example 8

A color image was prepared in the same manner as in Example 5, except that the color toner receptive layer was changed in the following manner.

Color Toner Receptive Layer 50 parts by weight of the crystalline polyester resin B and 50 parts by weight of the amorphous polyester resin J were subjected to a melt-mixing for 10 minutes in an extrusion kneader heated at 220° C., and pellets prepared therefrom were charged in a melt extruder heated at 170° C., discharged from a T-die and laminated to the base paper, bearing the light scattering layer, by nipping between a nip roller and a cooling roller to obtain a color toner receptive layer of a thickness of 20 μm. In the melt-mixing of the resins, $T_0$ was 280° C. at $t_0=5$ minutes. The color toner receptive layer had $T_1$ of 80° C.

Examples 1-8 are listed in FIG. 10.

Comparative Example 1

A color image was prepared in the same manner as in Example 1, except that the image supporting material was changed to a Mirror-coat Gold paper (basis weight: 210 gsm, manufactured by Oji Paper Co.).

Comparative Example 2

A color image was prepared in the same manner as in Example 1, except that the color toner receptive layer was changed in the following manner.

Color Toner Receptive Layer

The amorphous polyester resin H was charged in a melt extruder heated at 190° C., discharged from a T-die and laminated to the base paper, bearing the light scattering layer, by nipping between a nip roller and a cooling roller to obtain a color toner receptive layer of a thickness of 20 μm. The color toner receptive layer had $T_1$ of 115° C.

Comparative Example 3

A color image was prepared in the same manner as in Example 5, except that the color toner receptive layer was changed in the following manner.

Color Toner Receptive Layer 50 parts by weight of the crystalline polyester resin F and 50 parts by weight of the amorphous polyester resin J were subjected to a melt-mixing for 10 minutes in an extrusion kneader heated at 220° C., and pellets prepared therefrom were charged in a melt extruder heated at 210° C., discharged from a T-die and laminated to the base paper, bearing the light scattering layer, by nipping between a nip roller and a cooling roller to obtain a color toner receptive layer of a thickness of 20 μm. In the melt-mixing of the resins, $T_0$ was 290° C. at $t_0=5$ minutes. The color toner receptive layer had $T_1$ of 105° C.

Comparative Example 4

A color image was prepared in the same manner as in Example 5, except that the color toner receptive layer was changed in the following manner.

Color Toner Receptive Layer 50 parts by weight of the crystalline polyester resin G and 50 parts by weight of the amorphous polyester resin J were subjected to a melt-mixing for 10 minutes in an extrusion kneader heated at 220° C., and pellets prepared therefrom were charged in a melt extruder heated at 220° C., discharged from a T-die and laminated to the base paper, bearing the light scattering layer, by nipping between a nip roller and a cooling roller to obtain a color toner receptive layer of a thickness of 20 μm. In the melt-mixing of the resins, $T_0$ was 250° C. at $t_0=5$ minutes. The color toner receptive layer had $T_1$ of 90° C.

Comparative Example 5

A color image was prepared in the same manner as in Example 5, except that the color toner receptive layer was changed in the following manner.

(Color Toner Receptive Layer)

The amorphous polyester resin B was charged in a melt extruder heated at 200° C., discharged from a T-die and laminated to the base paper, bearing the light scattering layer, by nipping between a nip roller and a cooling roller to obtain a color toner receptive layer of a thickness of 20 μm. The color toner receptive layer had $T_1$ of 74° C.

Comparative Examples 1-5 are shown in FIG. 11.

Image Evaluation

Mechanical Strength

An image supporting material obtained in each of Examples and Comparative Examples was round on metal rollers of different radii and a minimum radius not generating cracking was determined. The result was evaluated as:
- ○: a radius smaller than 10 mm
- Δ: a radius equal to or larger than 10 mm but less than 30 mm
- ×: a radium equal to or larger than 30 mm.

Heat Resistance

Image supporting materials obtained in each of Examples and Comparative Examples were superposed in a contacted state between top surfaces thereof, placed in a thermostat chamber of a constant temperature under a load of 30 g/cm², then cooled to the room temperature of about 22° C. after 3 days and peeled. This test was repeated under different temperatures. The result was evaluated, by the temperature causing destruction of the image surface, as:
- ○: equal to or higher than 55° C.
- Δ: equal to or higher than 45° C. but lower than 55° C.
- ×: equal to or lower than 45° C.

Low-Temperature Fixing Property

Evaluation of luster

On an image obtained in each of Examples and Comparative Examples, a luster of a white background area was measured with a 75° luster meter (manufactured by Murakami Shikisai Gijutu Kenkyusho). The result was evaluated by the fixing temperature providing a luster of 90 or higher as:
- ○: lower than 90° C.
- Δ: equal to or higher than 90° C. but lower than 110° C.
- ×: equal to or higher than 110° C.

Evaluation of smoothness

On an image obtained in each of Examples and Comparative Examples, smoothness was evaluated visually. The result was evaluated by a temperature range at which bubbles could not be observed on the image surface, as:
- ○: equal to or higher than 30° C.
- Δ: equal to or higher than 10° C. but lower than 30° C.
- ×: equal to or higher than 10° C.

Solidification Speed

The solidification speed was evaluated in the following manner:
- ○: image outputted from the fixing apparatus being completely solidified and not leaving a fingerprint when touched with a hand
- Δ: image outputted from the fixing apparatus being not completely solidified, but showing no defect on the image surface and not causing a defect in the smoothness of the image surface when a next output image is superposed
- ×: image outputted from the fixing apparatus being not solidified, showing an unsmooth image surface, an uneven luster or an unpeelably stuck image to the belt after passing the peeling roller.

Total Image Quality

A total quality of the image obtain at a fixing temperature of 140° C. in each of Examples and Comparative Examples was ranked in following five categories:
- 5: very good
- 4: good
- 3: fair
- 2: poor
- 1: very poor The ranking was made by 10 persons, and the result was evaluated in terms of the points given by 10 persons as:
- ○: equal to or higher than 3.5 points
- Δ: equal to or higher than 2.5 but lower than 3.5 points
- ×: less than 2.5 points.

The results of the foregoing image evaluations are shown in FIG. 12.

According to FIG. 12, Examples 1-8 provided images satisfying the mechanical strength and heat resistance condition (requirements) and the low-temperature fixing property. Also these images were satisfactory with high total image quality.

On the other hand, images of Comparative Examples 1-5 were unable to meet either one of the mechanical strength, the heat sesistance and the low-temperature fixing property.

What is claimed is:

1. An image supporting material for fixably supporting an image of a color toner including at least a thermoplastic resin and a colorant, the image supporting material comprising:
   a base material;
   a light scattering layer provided on the base material and containing a white pigment and a thermoplastic resin; and
   a color toner receptive layer provided on the light scattering layer and containing at least a thermoplastic resin;
   wherein the thermoplastic resin in the light scattering layer comprises a polyolefin or a polyolefinic copolymer having a temperature Tb, at which viscosity becomes $5 \times 10^3$ Pa·s, of 100° C. or higher; and
   the thermoplastic resin in the color toner receptive layer comprises a resin obtained by melt mixing of a crystalline polyester resin and an amorphous resin and having a temperature $T_1$, at which viscosity becomes $10^3$ Pa·s, equal to or higher than 65° C. but lower than 80° C.

2. An image supporting material according to claim 1, wherein
   the base material is a base paper of a basis weight of 100 to 250 gsm.

3. An image supporting material according to claim 1, wherein
   the light scattering layer contains the white pigment in an amount of 20 to 40 wt. %.

4. An image supporting material according to claim 1, wherein
   the light scattering layer has a thickness of from 20 to 50 μm.

5. An image supporting material according to claim 1, wherein
   the color toner receptive layer contains the thermoplastic resin in an amount of 70 wt. % or higher.

6. An image supporting material according to claim 1, wherein
   the color toner receptive layer has a thickness of 5 to 20 μm.

7. An image supporting material according to claim 1, wherein
   in the thermoplastic resin of the color toner receptive layer, the crystalline polyester resin and the amorphous resin have a weight ratio within a range from 35:65 to 65:35.

8. An image supporting material according to claim 1, wherein
   the melt mixing of the crystalline polyester resin and the amorphous resin is executed under a condition of a temperature T (° C.) within a range from $T_0$ to $T_0+20$ and a time t (minute) within a range from $t_0$ to $10 \times t_0$, in which a melting mixing for a time $t_0$ (minute) at a temperature $T_0$ (° C.) of the crystalline polyester resin and the amorphous resin provides a resin showing a visual reflectance Y of 1.5% in a film of 20 μm.

9. An image supporting material according to claim 8, wherein
the temperature T (° C.) is within a range from $T_0+5$ to $T_0+10$ and the time t (minute) is within a range from $t_0$ to $3 \times t_0$.

10. An image supporting material according to claim 1, wherein
the amorphous resin is a polyester resin.

11. An image supporting material according to claim 10, wherein
the crystalline polyester resin and the amorphous polyester resin include a common alcohol-derived component or a common acid-derived component.

12. An image supporting material according to claim 11, wherein:
an alcohol-derived component of the amorphous polyester resin includes a linear aliphatic component which is the same as the linear aliphatic component with 2 to 12 carbon atoms, constituting a principal component of alcohol-derived component of the crystalline polyester resin, and which represents 10 to 30 mol. % of all the alcohol-derived component; and
an acid-derived component of the amorphous polyester resin includes an aromatic component, which represents 90 mol. % or more of all the acid-derived component.

13. An image supporting material according to claim 12, wherein:
the aromatic component constituting the acid-derived component of the amorphous polyester resin is the same as an aromatic component derived from terephthalic acid, isophthalic acid or naphthalenedicarboxylic acid, which is a principal component of the acid-derived component of the crystalline polyester resin.

14. An image supporting material according to claim 13, wherein:
the alcohol-derived component of the crystalline polyester resin includes a linear aliphatic component with 2 to 12 carbon atoms and an aromatic diol-derived component, in which the linear aliphatic component represents 85 to 98 mol. % and the aromatic diol-derived component represents 2 to 15 mol. % with respect to all the alcohol-derived components; and
the alcohol-derived component of the amorphous polyester resin includes a linear aliphatic component and an aromatic diol-derived component which are the same as principal components of the alcohol-derived component of the crystalline polyester resin, and in which the linear aliphatic component represents 10 to 30 mol. % and the aromatic diol-derived component represents 70 to 90 mol. % with respect to all the alcohol-drived components.

15. An image supporting material according to claim 1, wherein
the amorphous resin includes a styrene-based resin and an acrylic resin in an amount of 80% or more.

16. An image supporting material according to claim 1, wherein
an alcohol-derived component of the crystalline polyester resin is principally constituted of a linear aliphatic component with 2 to 12 carbon atoms, in which the linear aliphatic component represents 85 to 100 mol. % of all the alcohol-derived component; and
an acid-derived component of the crystalline polyester resin is principally constituted of a linear aliphatic component with 4 to 12 carbon atoms, in which an aromatic component represents 90 mol. % or more of all the acid-derived component.

17. An image supporting material according to claim 1, wherein
the crystalline polyester resin has a weight-averaged molecular weight of 17,000 to 30,000 and the amorphous resin has a weight-averaged molecular weight of 8,000 to 40,000.

18. An image supporting material according to claim 1, wherein
the color toner receptive layer includes inorganic fine particles in an amount of 3 to 30 wt. %.

19. An image supporting material according to claim 18, wherein
the inorganic fine particles comprises titanium dioxide or silica with a particle size of 8 to 400 nm.

20. An image supporting material according to claim 1, further comprising:
an antistatic layer on at least either of a front surface or a rear surface.

21. An image supporting material according to claim 1, further comprising:
a gelatin layer between the light scattering layer and the color toner receptive layer.

22. A method of using an image supporting material according to claim 1, wherein:
the thermoplastic resin of the color toner principally comprises a polyester resin or a styrene-acrylic resin having a temperature $T_2$, at which viscosity thereof becomes $10^4$ Pa·s, equal to or higher than $T_1$ (° C.) but is lower than $T_1+20$ (° C.).

23. A method of using an image supporting material according to claim 22, wherein:
the thermoplastic resin of the color toner at least includes a crystalline polyester resin and an amorphous styrene-acrylic resin.

24. An image forming apparatus comprising:
an image supporting material for fixably supporting an image of a color toner including at least a thermoplastic resin and a colorant;
an image forming unit for forming an image of the color toner on the image supporting material; and
a fixing apparatus for fixing the image of the color toner, formed by the image forming unit, on the image supporting material; wherein
the image supporting material includes:
a base material;
a light scattering layer provided on the base material and containing a white pigment and a thermoplastic resin; and
a color toner receptive layer provided on the light scattering layer and containing at least a thermoplastic resin;
the thermoplastic resin in the light scattering layer comprises a polyolefin or a polyolefinic copolymer having a temperature Tb, at which viscosity becomes $5 \times 10^3$ Pa·s, of 100° C. or higher; and
the thermoplastic resin in the color toner receptive layer comprises a resin obtained by a melt mixing of a crystalline polyester resin and an amorphous resin and having a temperature $T_1$, at which viscosity becomes $10^3$ Pa·s, equal to or higher than 65° C. but lower than 80° C.

25. An image forming apparatus according to claim 24, wherein the fixing apparatus includes:

a fixing member contacted with the image supporting material across an image thereon;

a heat-pressurizing unit which heats and pressurizes the image of the color toner on the image supporting material; and a cool-peeling unit which cools and peels the heat-pressurized image of the color toner from the fixing member.

* * * * *